United States Patent [19]

Suzuki

[11] Patent Number: 5,285,334
[45] Date of Patent: Feb. 8, 1994

[54] INTERMITTENTLY OPERATING DRIVING MECHANISM FOR RECORD MEDIUM SELECTING APPARATUS OF PLAYER

[75] Inventor: Tomoyuki Suzuki, Saitama, Japan

[73] Assignee: Pioneer Electronic Corporation, Tokyo, Japan

[21] Appl. No.: 902,812

[22] Filed: Jun. 23, 1992

[30] Foreign Application Priority Data

Dec. 27, 1991 [JP] Japan ............................ 3-347072

[51] Int. Cl.$^5$ ............................................ G11B 15/68
[52] U.S. Cl. ..................................................... 360/92
[58] Field of Search ............... 360/92, 98.06; 414/932; 369/34, 36, 191, 192

[56] References Cited

U.S. PATENT DOCUMENTS

| | | | |
|---|---|---|---|
| 5,025,338 | 6/1991 | Sone et al. | 360/92 |
| 5,115,362 | 5/1992 | Harada et al. | 360/92 |
| 5,173,889 | 12/1992 | Nagahira et al. | 360/92 |

FOREIGN PATENT DOCUMENTS

| | | | |
|---|---|---|---|
| 2-16652 | 8/1990 | Japan | 360/92 |
| 2-16658 | 8/1990 | Japan | 360/92 |
| 2-216650 | 8/1990 | Japan . | |
| 184757 | 7/1992 | Japan | 360/92 |

Primary Examiner—John T. Kwon
Attorney, Agent, or Firm—Sughrue, Mion, Zinn, Macpeak & Seas

[57] ABSTRACT

An intermittently operating driving mechanism for a record medium selecting apparatus of a player wherein two principal components thereof do not operate at a time but operate independently of each other to assure a high space factor and the interval of time over which each of them do not operate can be set freely. A tray base plate selectively receives, at an outwardly projected position, tape cassettes on cassette receiving members thereon and moves to a home position, at which one of the cassettes is selected. The selected cassette is transported by a tray driving plate to a playing position at which the cassette is played. Each of the tray base plate and the tray driving plate has a toothed portion, with which a gear of a cam plate is selectively engaged to move the tray base plate or the tray driving plate between the respective end positions of movement. Cam levers cooperate with the cam plate to positively hold the tray base plate and the tray driving plate from moving from the respective home positions.

12 Claims, 23 Drawing Sheets

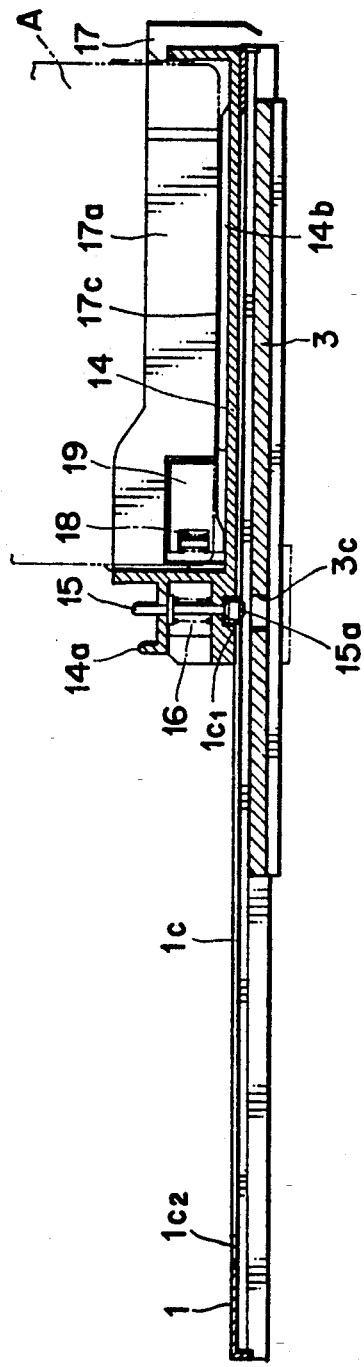
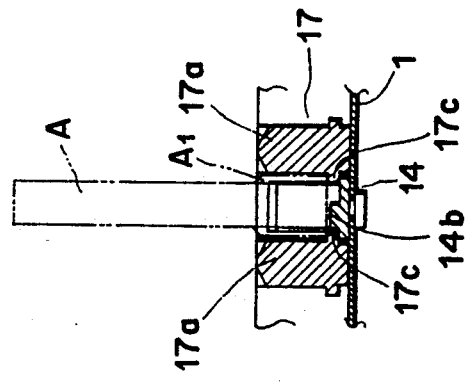
FIG. 3a
FIG. 3b

INTERMITTENTLY OPERATING DRIVING MECHANISM FOR RECORD MEDIUM SELECTING APPARATUS OF PLAYER

BACKGROUND OF THE INVENTION

1. Field of the Invention

This invention relates generally to a record medium player for recording and/or reproducing a record medium such as a digital audio tape, a cassette tape, a compact disk or a video disk and particularly to an intermittently operating driving mechanism for a record medium selecting apparatus of a player of the type mentioned which selects one of a plurality of record media placed on a tray and feeds the selected record medium to a recording/reproducing position.

2. Description of the Prior Art

An intermittently operating driving apparatus for a player of the type mentioned is already known and disclosed, for example, in Japanese Patent Laid-Open Application No. 2-216650. In the player, a plurality of tape cassettes are placed on a tray which is drawn out forwardly from a front panel of a player body, and the tray is drawn into the player body by means of the intermittently operating driving mechanism and then only one of the tape cassettes on the tray is fed to the recording/reproducing position, at which information such as music is recorded onto or reproduced from a record medium, i.e., a magnetic tape, in the tape cassette.

The intermittently operating driving mechanism in the player includes a tray base plate for receiving a plurality tape cassettes thereon, a tray driving plate connected to the tray base plate by way of a ball, and a motor for driving the tray base plate and the tray driving plate. The tray base plate is moved by the tray driving plate by way of the ball until it is drawn into the player body, and after the tray base plate is accommodated fully into the player body, the engagement between the tray base plate and the tray driving plate by way of the ball is cancelled and only the tray driving plate is moved to feed a tape cassette to the recording-/reproducing position.

With such an intermittently operating driving mechanism which makes use of a ball as described above, however, the strength of a portion on which the ball slidably moves is not assured and the portion is liable to be damaged or broken. Besides, since the ball is liable to drop out of position, a trouble is liable to occur. Further, since both of the tray base plate and the tray driving plate move simultaneously within a certain section, the space factor is low. Besides, since the tray driving plate must operate over a full stroke, such a mechanism as a speed doubling or magnifying mechanism is required, which requires a high cost.

SUMMARY OF THE INVENTION

It is an object of the present invention to provide an intermittently operating driving mechanism for a record medium selecting apparatus of a player wherein two principal components thereof do not operate at a time but operate independently of each other to assure a high space factor and the interval of time over which each of them do not operate can be set freely.

In order to attain the object, according to the present invention, there is provided an intermittently operating driving mechanism for a record medium selecting apparatus of a player, which comprises a plurality of record medium receiving members each for removably receiving a record medium thereon, a first member carrying the record medium receiving members thereon and movable between a first position and a second position at which the record medium receiving members can selectively receive record media thereon, the first member having a toothed portion thereon, means for selecting one of the record medium receiving members on the first member at the first position, a second member movable from a first position to a second position to transport a selected one of the record medium receiving members to a playing position to allow the record medium on the selected record medium receiving member to be played by the player and back from the second position to the first position to return the record medium to the selected record medium receiving member, the second member having a toothed portion thereon, a cam plate rotatable around a fixed axis and having a gear for selectively engaging with the toothed portion of the first or second member to move the first or second member between the first and second positions, and first and second cam levers for cooperating with the cam plate to positively hold the first or second member, when the first or second member is positioned at the first position, from movement from the first position.

In the intermittently operating driving mechanism for a record medium selecting mechanism of a player, when the cam plate rotates in one direction, the first member is moved, through engagement of the toothed portion thereof with the gear of the cam plate, from the second position to the first position, and after the first member comes to the first position, the engagement is cancelled and the first cam lever thereafter holds, cooperating with the cam plate, the first member from movement from the first position. Then, when the cam plate rotates in the same direction again, the second member is released from holding from movement from the first position by the second cam lever cooperating with the cam plate and is moved, through engagement of the toothed portion thereof with the gear of the cam plate, from the first position to the second position. During such movement of the second member, the first member is positively held at the first position.

Accordingly, with the intermittently operating driving mechanism, starting and stopping positions of a movement of the first member and starting and stopping positions of a movement of the second member can be arbitrarily set by a location of the gear of the cam plate for engaging with the toothed portions of the first and second members, and consequently, times for which each of the first and second members operates and do not operate can be set freely. The intermittently operating driving mechanism can thus be adopted as an intermittently operating driving mechanism for an apparatus in which different members are required to individually operate intermittently such as a member for transportation of record media from a receiving position at which record media can be removably received on the member to a waiting position and another member for transportation of a selected record medium from the waiting position to a playing position at which the selected record medium is recorded or reproduced.

Further, since the first and second members can be positively held from moving from the respective first positions by the cam plate by way of the first and cam levers, respectively, a movement of each of the first and second members can be stopped positively at a good timing, and consequently, otherwise possible inaccuracy in stopping position of the first or second member which may arise from an impact, inertia and so forth can be eliminated and various problems arising from such inaccuracy can be eliminated. Thus, the intermittently operating driving mechanism is simple in construction, minimized in trouble and high in reliability.

Preferably, the intermittently operating driving mechanism further comprises an additional cam lever for cooperating with the cam lever, and a switch for being operated by the additional cam lever to produce an electric signal for controlling rotation of the cam plate. Thus, rotation of the cam plate is controlled in response to the switch which may be operated by the cam plate at each stopping position of an intermittent movement such as the first and second positions of the first and second members, and consequently, each intermittent operation can be performed at a good timing.

The above and other objects, features and advantages of the present invention will become apparent from the following description and the appended claims, taken in conjunction with the accompanying drawings.

BRIEF DESCRIPTION OF THE DRAWINGS

FIG. 3a is an enlarged sectional view of the tape cassette accommodating member of FIG. 1, and FIG. 3b is a further enlarged partial sectional view of the tape cassette accommodating member;

DESCRIPTION OF THE PREFERRED EMBODIMENT

Figure 1:
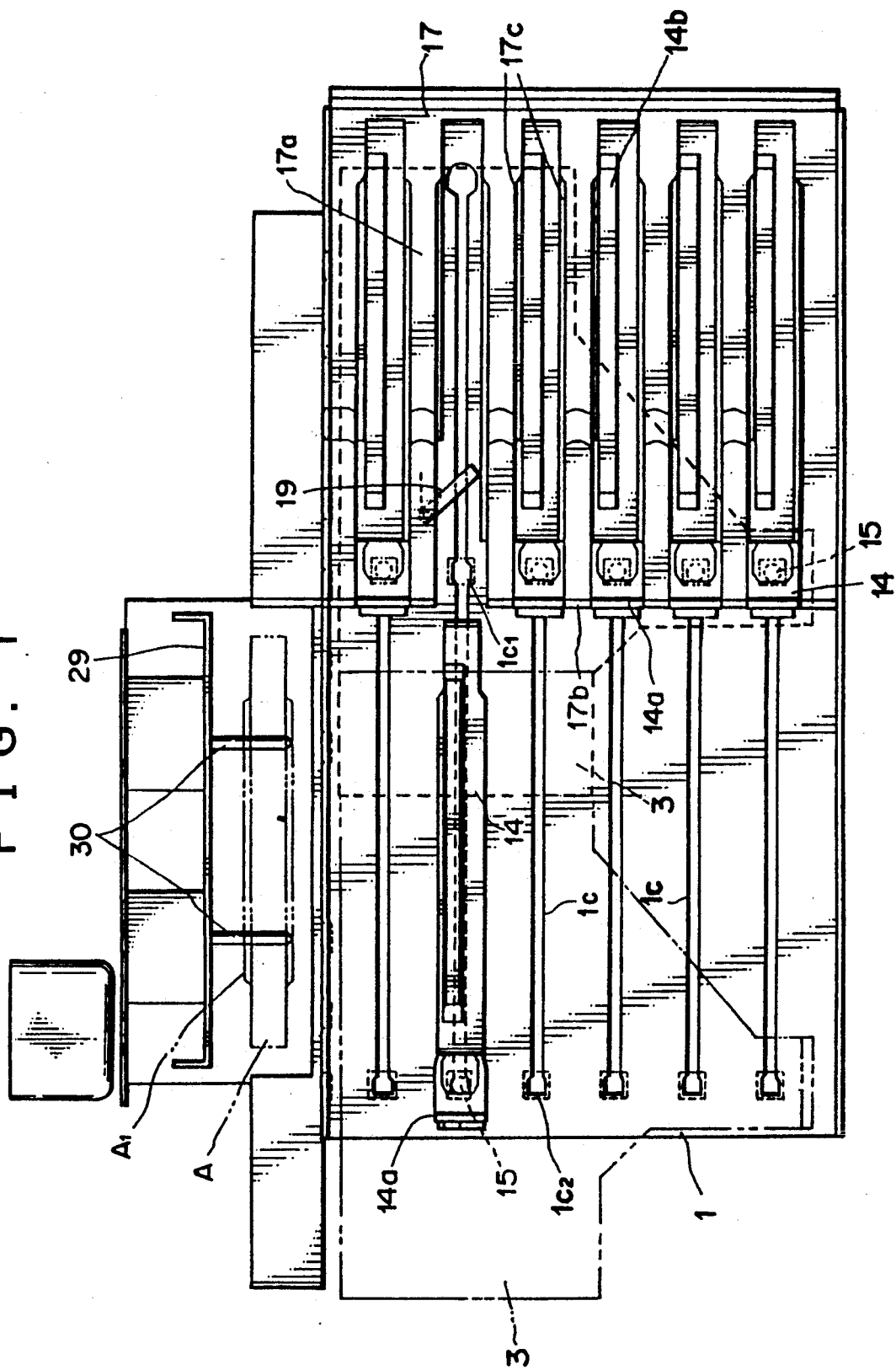
FIG. 1 is a plan view showing a cassette changer in which a record medium selecting apparatus according to the present invention is incorporated when an accommodating member is at its home position.
Figure 2:
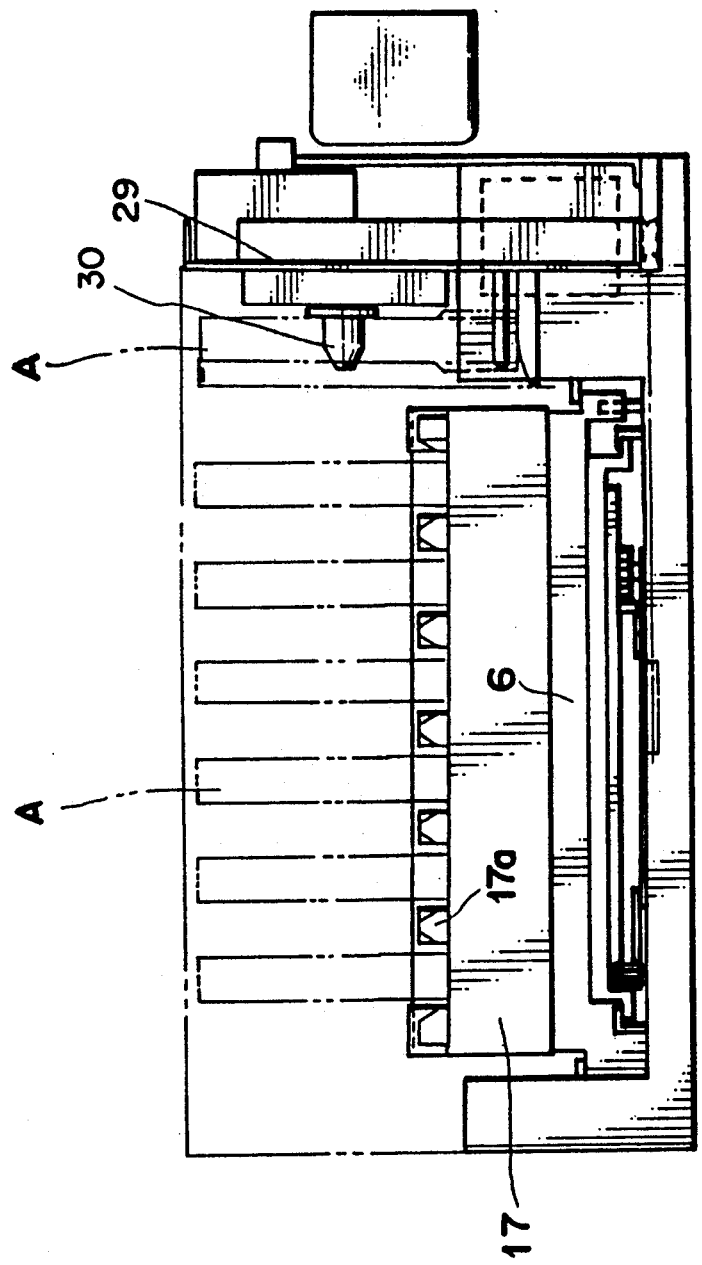
FIG. 2 is a front elevational view showing the cassette changer with a front pane removed.
Figure 4:
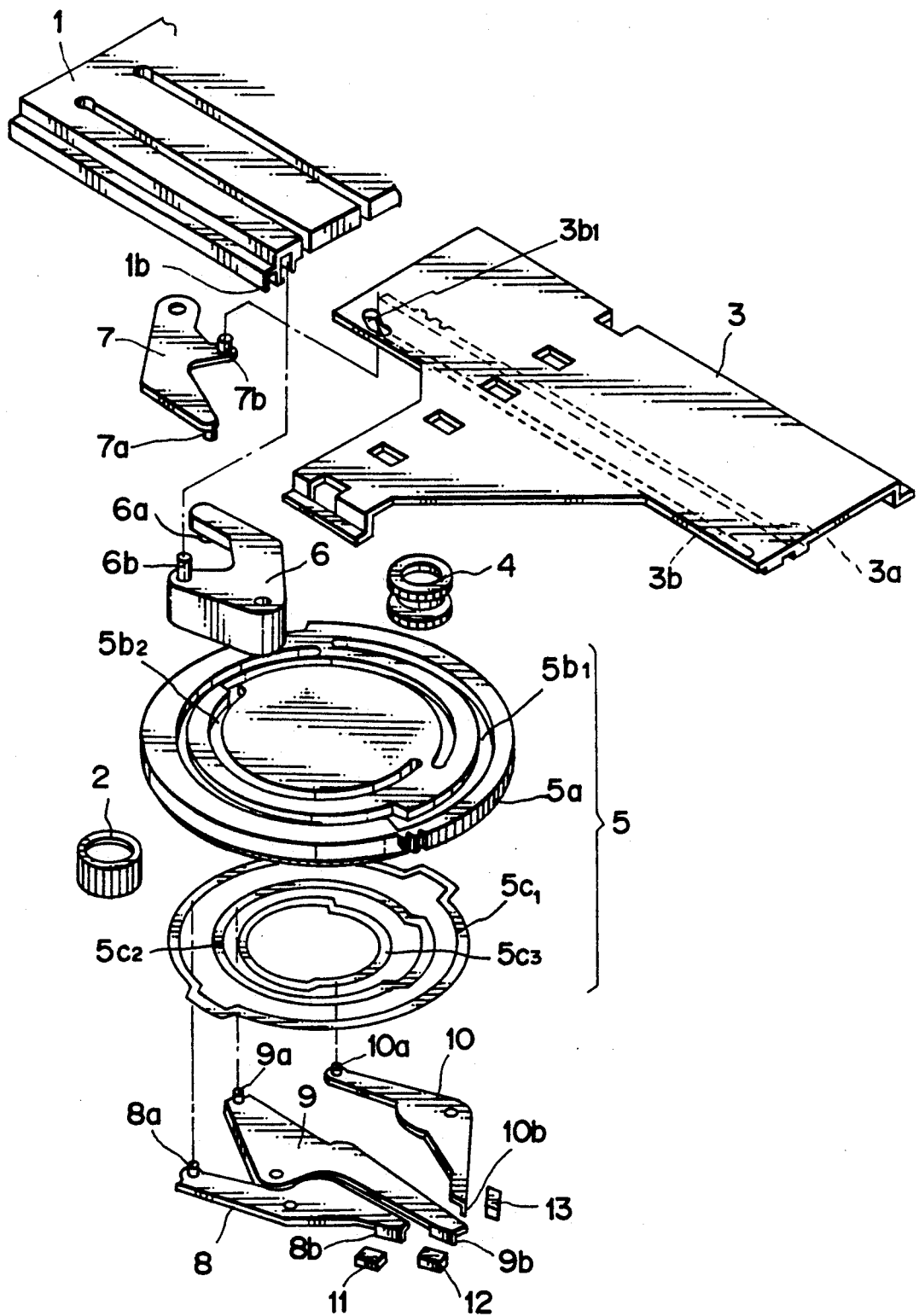
FIG. 4 is a fragmentary perspective view of a tray base plate, a tray driving plate, a cam plate and associated members of the record medium selecting apparatus.
Figure 5:
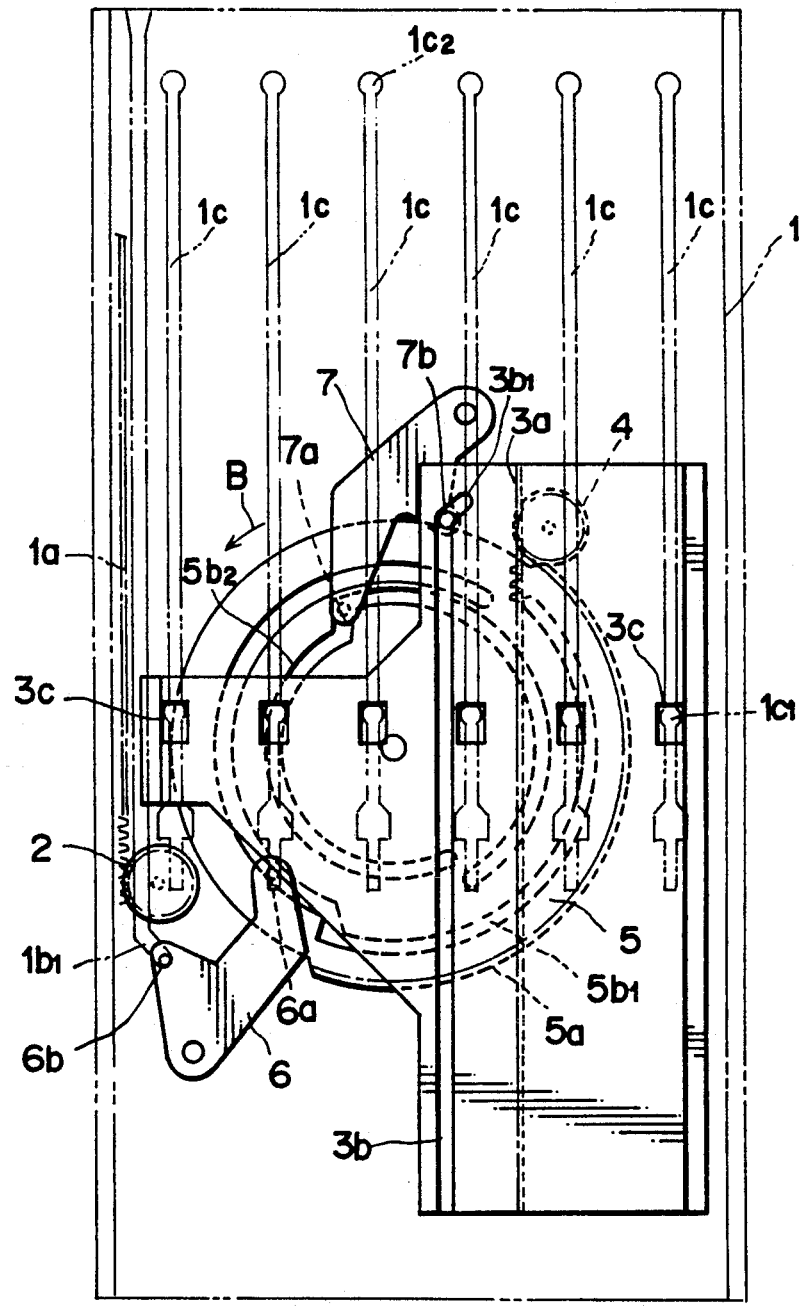
FIG. 5 is a plan view showing the record medium selecting apparatus in an assembled condition.
Figure 6:
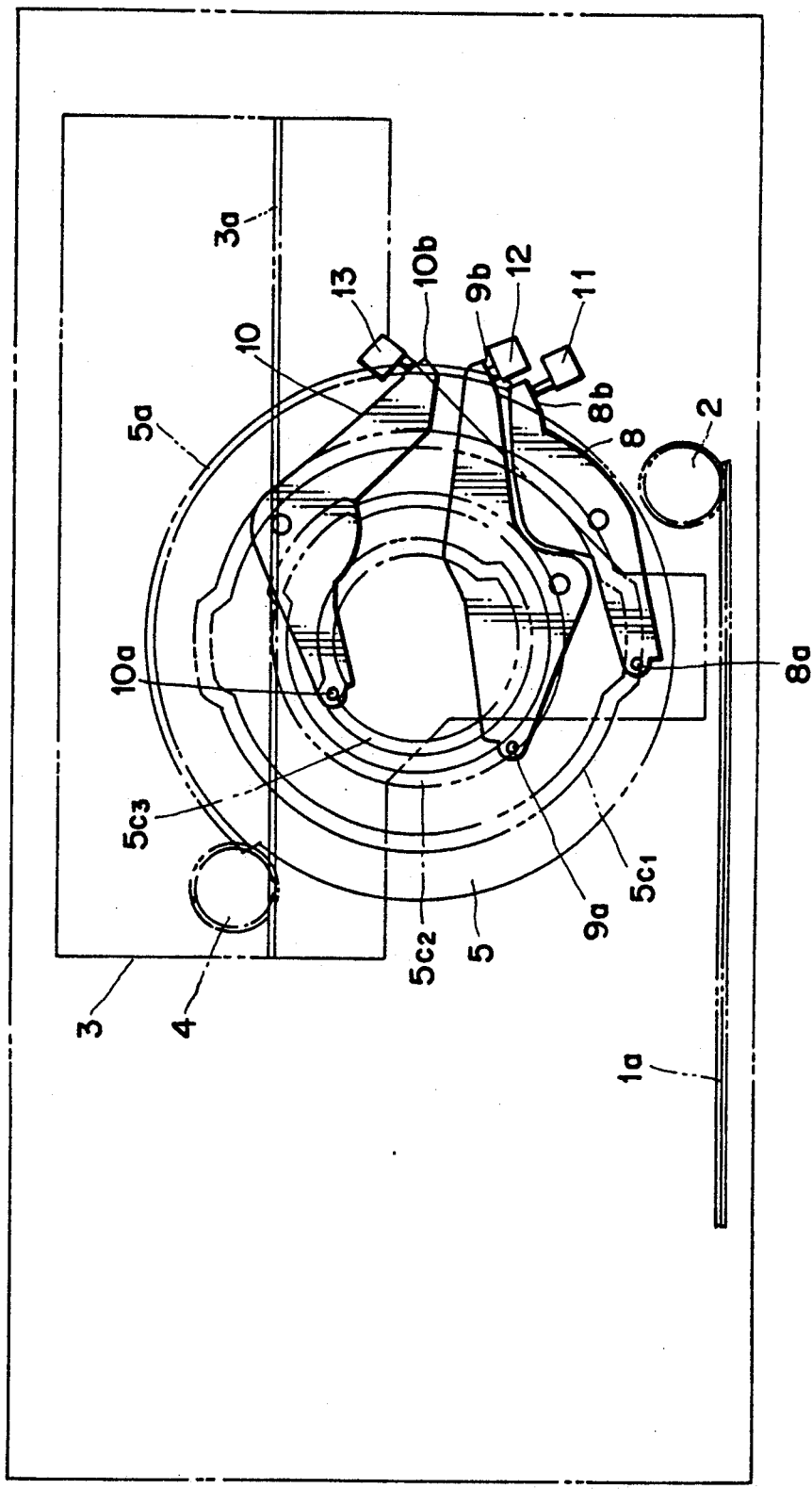
FIG. 6 is a plan view showing the record medium selecting apparatus in a through-vision condition.

Referring first to FIGS. 1, 4 and 5, there is shown a record medium selecting apparatus for a tape player in which an intermittently operating driving mechanism according to the present invention is incorporated. The record medium selecting apparatus shown includes a tray base plate 1 supported for sliding movement on a chassis not shown of the tape player. The tray base plate 1 has rack teeth $1a$ formed in a longitudinal direction along a side portion of a rear face thereof, and a first gear 2 is supported for rotation on the chassis and held in meshing engagement with the rack teeth $1a$ of the tray base plate 1. Consequently, when the gear 2 rotates, the tray base plate 1 is moved in a leftward or rightward direction in FIG. 1, i.e., in an upward or downward direction in FIG. 5.

A tray driving plate 3 is supported for sliding movement on the chassis below the tray base plate 1. The tray driving plate 3 has rack teeth $3a$ formed in a longitudinal direction at the center of a rear face thereof, and a second gear 4 is supported for rotation on the chassis and held in meshing engagement with the rack teeth $3a$ of the tray driving plate 3. Consequently, when the gear 4 rotates, the tray driving plate 3 is slidably moved in the leftward or rightward direction in FIG. 1, i.e., in the upward or downward direction in FIG. 5, similarly to the tray base plate 1. The first and second gears 2 and 4 are supported for rotation at locations opposite to each other with respect to a cam plate 5.

The cam plate 5 is supported for rotation on the chassis below the tray driving plate 3 and is rotated by way of a gear train not shown by a motor not shown. The cam plate 5 has an intermittent gear $5a$ formed on an outer periphery thereof such that it has a toothed portion formed over such an extent as to allow engagement thereof with only one of the first and second gears 2 and 4 and a non-toothed portion formed over a sufficient extent as to allow opposition thereof to both of the first and second gears 2 and 4.

An outer circular cam groove $5b_1$ and an inner circular cam groove $5b_2$ for preventing sliding movements of the tray base plate 1 and the tray driving plate 3, respectively, are formed on an upper face of the cam late 5 while an outer circular cam groove $5c_1$, an intermediate circular cam groove $5c_2$ and an inner circular cam groove $5c_3$ for controlling on/off switching operations of three switches, which will be hereinafter described, are formed on a lower face of the cam plate 5. It is to be noted that, in FIG. 4, the cam grooves $5c_1$, $5c_2$ and $5c_3$ formed on the lower face of the cam plate 5 are shown separately below the cam plate 5 for the convenience of illustration.

A first lever 6 of a substantially V shape in plan is supported for pivotal motion on the chassis above the cam plate 5. The first lever 6 has, on a lower face at an end thereof, an engaging projection $6a$ which engages with the cam groove $5b_1$ of the cam plate 5. The first lever 6 further has, on an upper face at the other end thereof, a guide pin $6b$ which engages with an elongated guideway or groove $1b$ formed on a rear face of the tray base plate 1. A second lever 7 of a substantially T shape in plan is supported for pivotal motion on the chassis above the cam plate 5. The second lever 7 has, on a lower face at an end thereof, an engaging projection $7a$ which engages with the cam groove $5b_2$ of the cam plate 5. The second lever 7 further has, on an upper face of the other end thereof, a guide pin $7b$ which engages with an elongated guideway or groove $3b$ formed on the tray driving plate 3.

Referring particularly to FIG. 5, a bent portion $1b_1$ or $3b_1$ is formed at an end of each of the elongated grooves $1b$ and $3b$ of the tray base plate 1 and the tray driving plate 3. The cam grooves $5b_1$ and $5b_2$ of the cam plate 5 are so shaped that the guide pins $6b$ and $7b$ of the first and second levers 6 and 7 may be positioned at the bent portions $1b_1$ and $3b$ i of the elongated grooves $1b$ and $3b$ of the tray base plate 1 and the tray driving plate 3, respectively, when the tray base plate 1 and the tray driving plate 3 are at respective fixed home positions which will be hereinafter described. When the guide pins $6b$ and $7b$ are positioned at the bent portions $1b_1$ and $3b$ i, respectively, even if an external force is applied to the tray base plate 1 or the tray driving plate 3, it will not be moved at all.

Referring back to FIGS. 1, 4 and 5, third, fourth and fifth levers 8, 9 and 10 are supported for individual pivotal motion on the chassis below the cam plate 5. The third to fifth levers 8, 9 and 10 have, on upper faces at one ends thereof, engaging projections $8a$, $9a$ and $10a$ for engaging with the cam grooves $5c_1$ to $5c_3$, respectively, of the cam plate 5. The third to fifth levers 8, 9 and 10 further have, at the other ends thereof, projections $8b$, $9b$ and $10b$ in the form of bent lugs for operating switches 11, 12 and 13, respectively, for controlling on/off operations of the motor for the cam plate 5 which will be hereinafter described.

Figure 12:
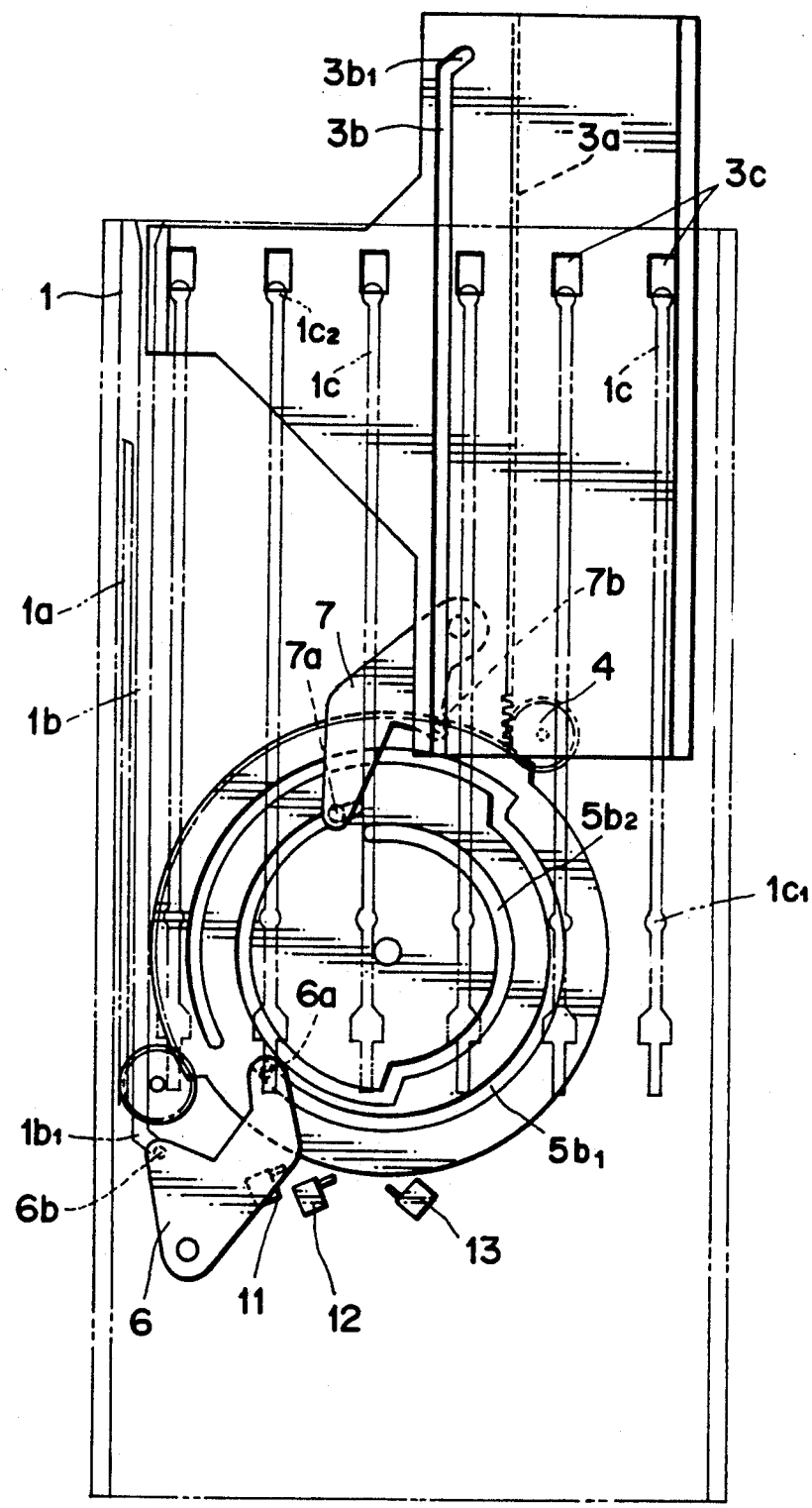
FIG. 12 is a plan view showing a relationship of the tray base plate, tray driving plate and cam plate when the tape cassette accommodating member is at the transfer position.
Figure 15:
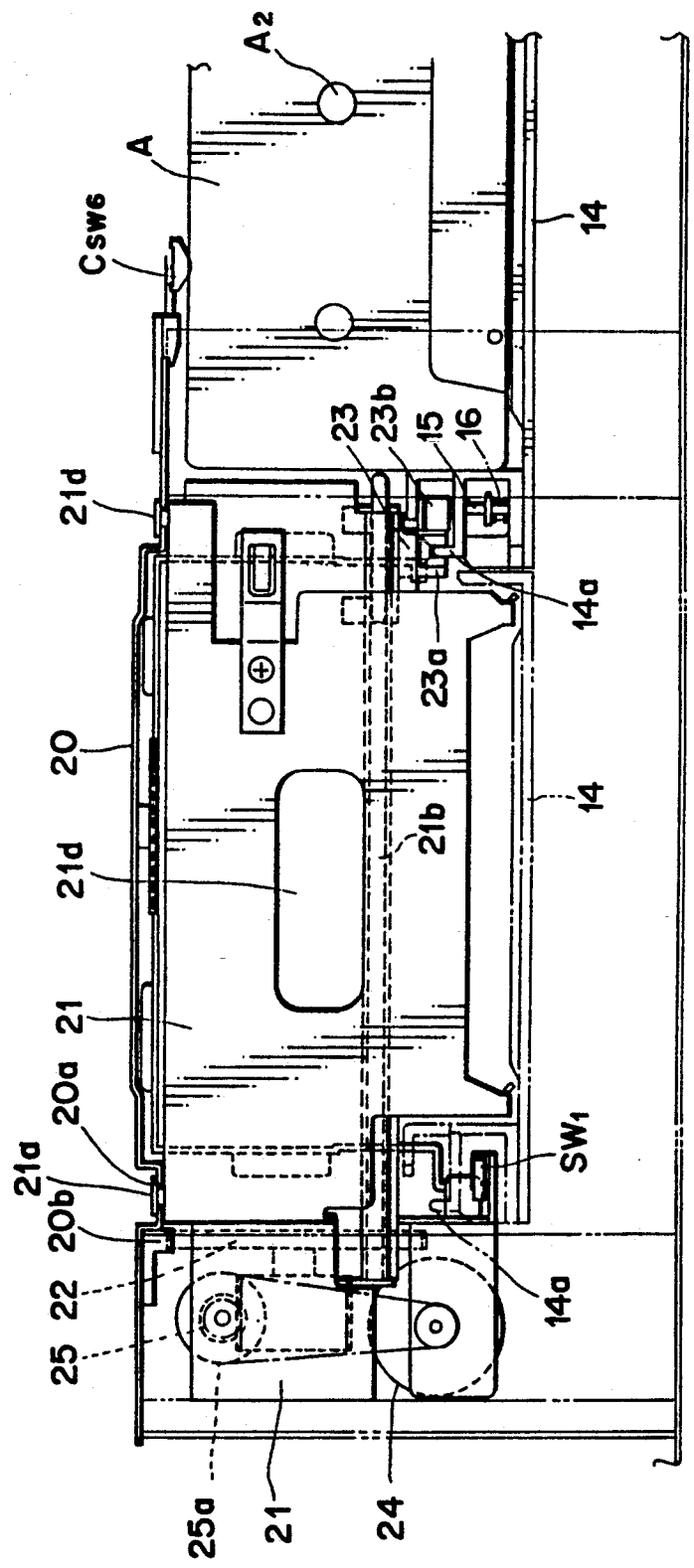

Referring now to FIGS. $3a$ and $3b$, a plurality of cassette receiving members 14 are disposed on the tray base plate 1 for individual movement under the guidance of guide slits $1c$ formed in the longitudinal direction in the tray base plate 1. Each of the cassette receiving members 14 is constructed such that it can receive therein a tape cassette A with a tape exposing wall, along which a tape in the tape cassette A is exposed outside, thereof directed downwardly as seen in FIGS. 12 and 15 holding the opposite left and right end faces of the tape cassette A.

A pin 15 having an expanded portion $15a$ formed at a lower end thereof is fitted for vertical axial movement in each of the cassette receiving members 14 and normally biased upwardly by means of a compression coil spring 16 so that the expanded portion $15a$ thereof may be fitted in either of a pair of expanded portions $1c_1$ and $1c_2$ at the opposite ends of the associated guide slit $1c$ to prevent the cassette receiving member 14 from moving along the guide slit $1c$ relative to the tray base plate 1.

Meanwhile, the tray driving plate 3 has a plurality of engaging holes $3c$ perforated one for each pin 15 at locations thereof at which the engaging holes $3c$ can be registered with the expanded portions $15a$ of the pins 15. Thus, when one of the pins 15 is pushed at the top thereof to move down, the expanded portion $15a$ thereof is moved downwardly out of the expanded portion $1c_1$ of the guide slit $1c$ into the engaging hole $3c$ registered with the expanded portion $1c_1$ thereby to permit movement of the cassette receiving member 14 along the guide slit $1c$.

Figure 8:
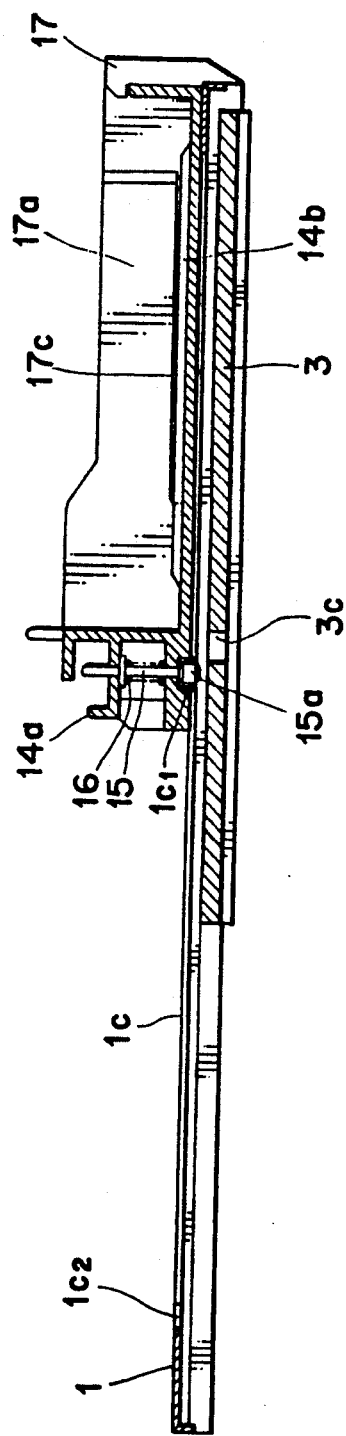

If, in this condition, the tray driving plate 3 is driven to move backwardly, that is, leftwardly in FIG. $3a$, the cassette receiving member 14 is moved in the same direction due to engagement between the expanded portion $15a$ of the pin 15 and the engaging hole $3c$ of the tray driving plate 3. Such movement of the cassette receiving member 14 will continue until the expanded portion $15a$ of the pin 15 comes to the position of the other expanded portion $1c_2$ of the guide slit $1c$, at which it is displaced out of the engaging hole $3c$ of the tray driving plate 3 and received into the expanded portion $1c_2$ of the guide slit $1c$ as shown in FIG. 8 by the biasing force of the spring 16 to stop further movement of the cassette receiving member 14. When the tray driving plate 3 is driven to move in the reverse direction from its solid line position shown in FIG. 11, the cassette receiving member 14 will be moved to the position at which the expanded portion $15a$ of the pin 15 thereon is received into the expanded portion $1c_1$ of the guide slit $1c$.

Each of the cassette receiving members 14 is mounted for sliding movement on a bottom face of a cassette accommodating section which is defined by a pair of adjacent ones of a plurality of partition walls $17a$ of an accommodating member 17 and has a width a little greater than the thickness of a thicker portion $A_1$ of a tape cassette A. The accommodating member 17 has formed on the bottom face of each of the cassette accommodating sections thereof a pair of ribs $17c$ for supporting the opposite edge portions of the tape exposing wall adjacent the thicker portion $A_1$ of a tape cassette A along which the tape in the tape cassette A is exposed outside. Thus, the tape cassette A is supported by the pair of ribs $17c$ and the partition walls $17a$ of the cassette accommodating section. Accordingly, even when the accommodating member 17 is drawn out forwardly of the tape player or introduced into the inside of the tape player, the tape cassette A will remain in a stabilized condition in the cassette accommodating section and will produce no rattling noise.

Meanwhile, each of the cassette receiving members 14 has a rib $14b$ formed thereon such that it may be positioned between the ribs $17c$ of the cassette accommodating section. The rib $14b$ is formed a little lower than upper faces of the ribs $17c$ of the cassette accommodating section such that, when the cassette receiving member 14 is positioned in the accommodating member 17, it may not be contacted with the tape exposing wall of a tape cassette A along which the tape in the tape cassette A is exposed outside as shown in FIG. $3a$. However, when the cassette receiving member 14 is moved away from the accommodating member 17, the tape exposing wall of the tape cassette A is contacted with and received by the rib $14b$.

Figure 7:
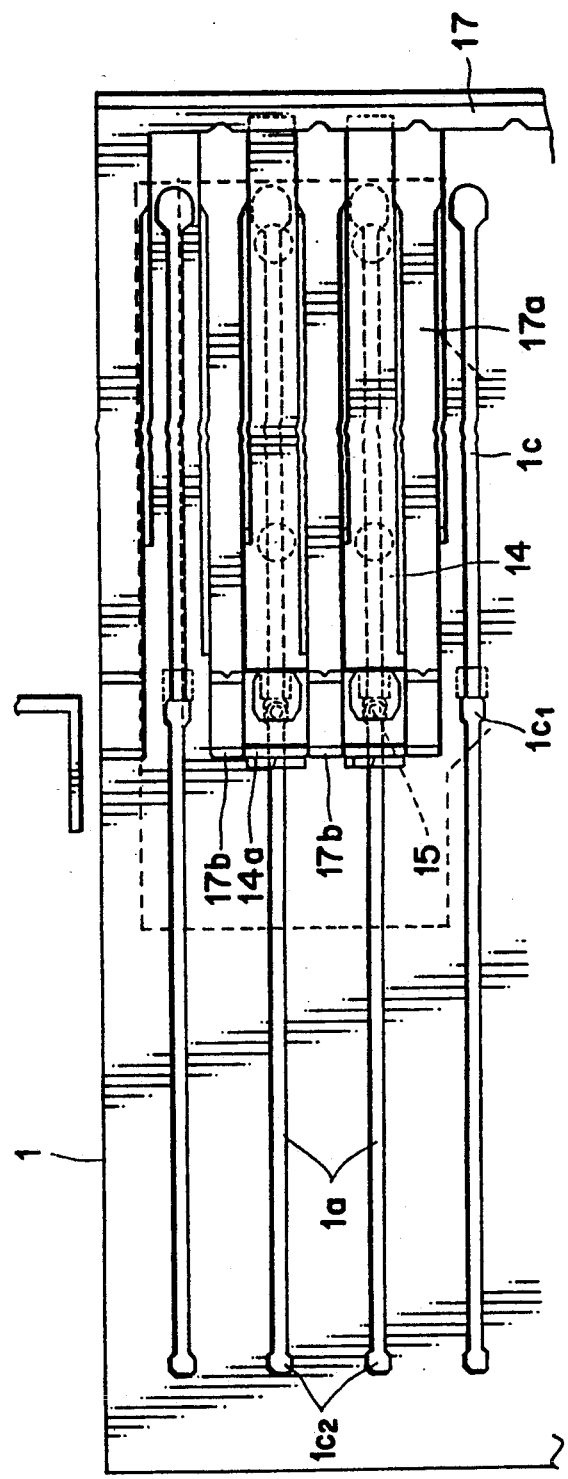
FIGS. 7 and 8 are a plan view and a sectional view, respectively, showing, in an enlarged scale, the tape cassette accommodating member at the position shown in FIG. 3.

Referring now to FIGS. 3a, 3b and 7, each of the partitioning walls 17a of the accommodating member 17 and the cassette receiving members 14 has an aligning wall 17b or 14a formed at a rear end, i.e., left end in FIG. 7, thereof. The aligning walls 17b and 14a make a straight line extending in a direction of a row of tape cassettes A accommodated on the accommodating member 17 when the expanded potions 15a of the pins 15 of the cassette receiving members 14 are fitted in the expanded portions $1c_1$ of the guide slits 1c of the tray base plate 1.

Figure 17:
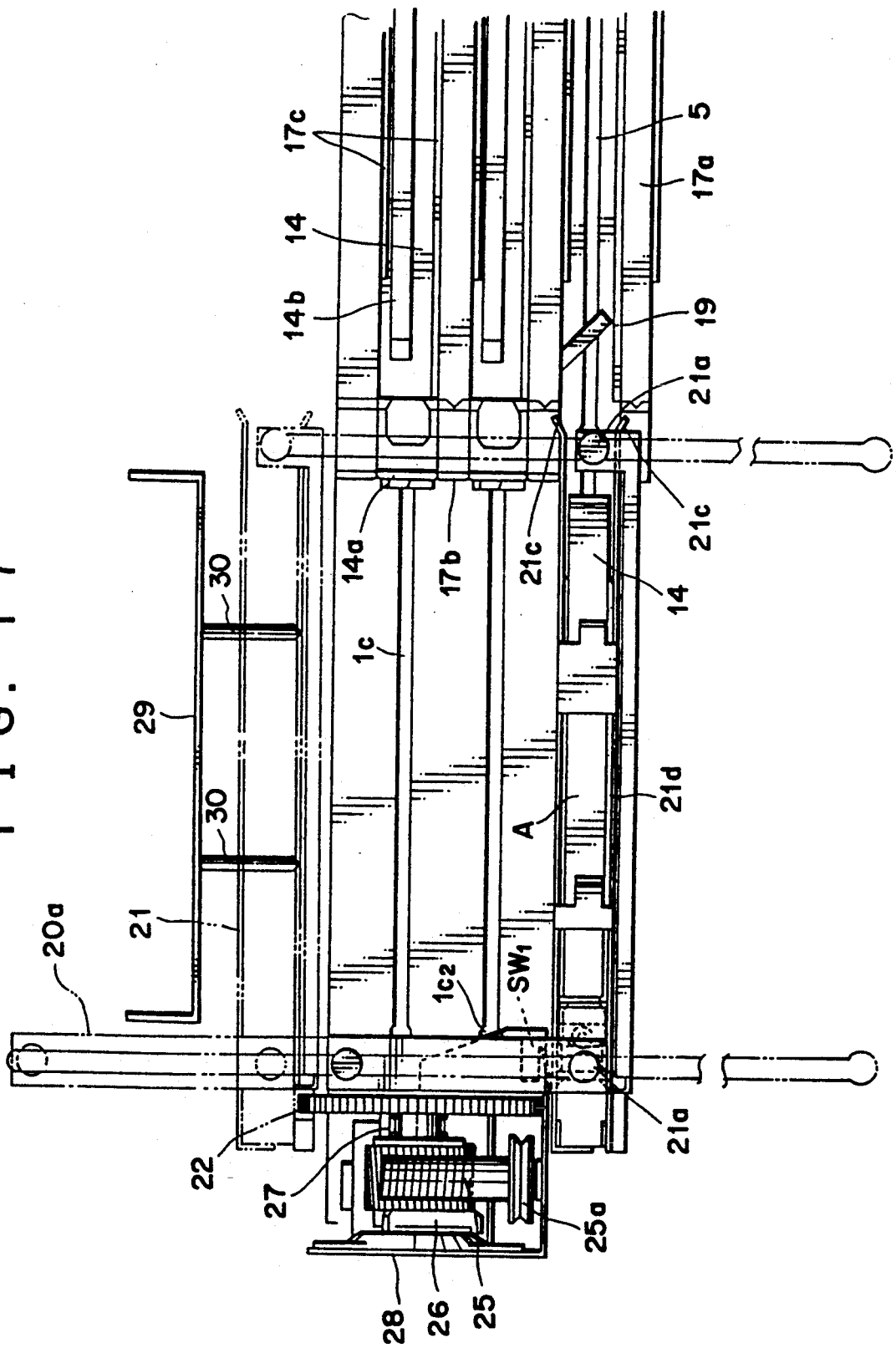
FIG. 17 is a plan view similar to FIG. 13 but showing the carrier operating mechanism when a tape cassette is at the transfer position.

Referring to FIGS. 3a and 17, a projecting wall 19 is fitted in a recess formed in each of the partition walls 17a and supported for pivotal motion between a position in which it is accommodated in the recess and another position in which it projects from the partition wall 17a into the cassette accommodating section as shown in FIG. 1 or 17 and to which it is normally biased by a torsion coil spring 18. When the cassette receiving member 14 is introduced into the cassette accommodating section or spacing between the adjacent partition walls 17a, the projecting wall 19 is pushed by the cassette receiving member 14 and accommodated into the recess of the partition wall 17a. On the contrary, if the cassette receiving member 14 is moved out from between the partition walls 17a, then the projecting wall 19 is projected by the biasing force of the torsion spring 18 to the location from which the cassette receiving member 14 has been moved out, thereby preventing another tape cassette A from being inserted into the spacing between the partition walls 17a when the cassette casing member 14 is not positioned between the partition walls 17a.

Figure 13:
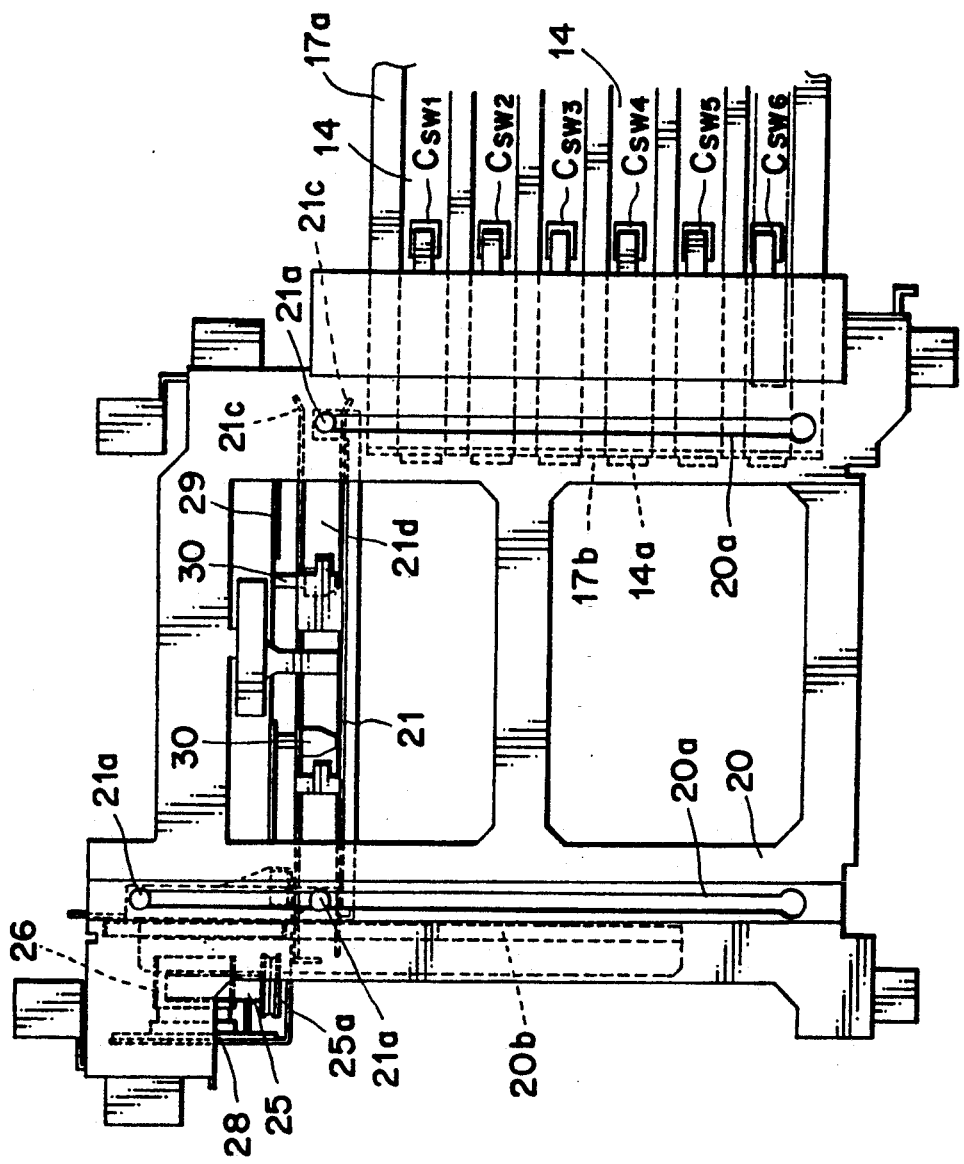
FIG. 13 is a plan view showing a carrier operating mechanism of the record medium selecting apparatus when a carrier contacts with a tape feeding chassis.

Referring now to FIG. 13, a rail member 20 is disposed above the chassis not shown, and a pair of rail slots 20a are formed in the rail member 20 and extend in a direction perpendicular to the guide slits 1c of the tray base plate 1. A carrier 21 is disposed for upward and downward movement in FIG. 13 along the rail slots 20a of the rail member 20. In particular, the carrier 21 has three guide pins 21a two of which are fitted for sliding movement in a front side one, right side one in FIG. 13, of the rail slots 20a while the remaining guide pin 21a is fitted for sliding movement in the other rear side rail slot 20a.

Figure 14:
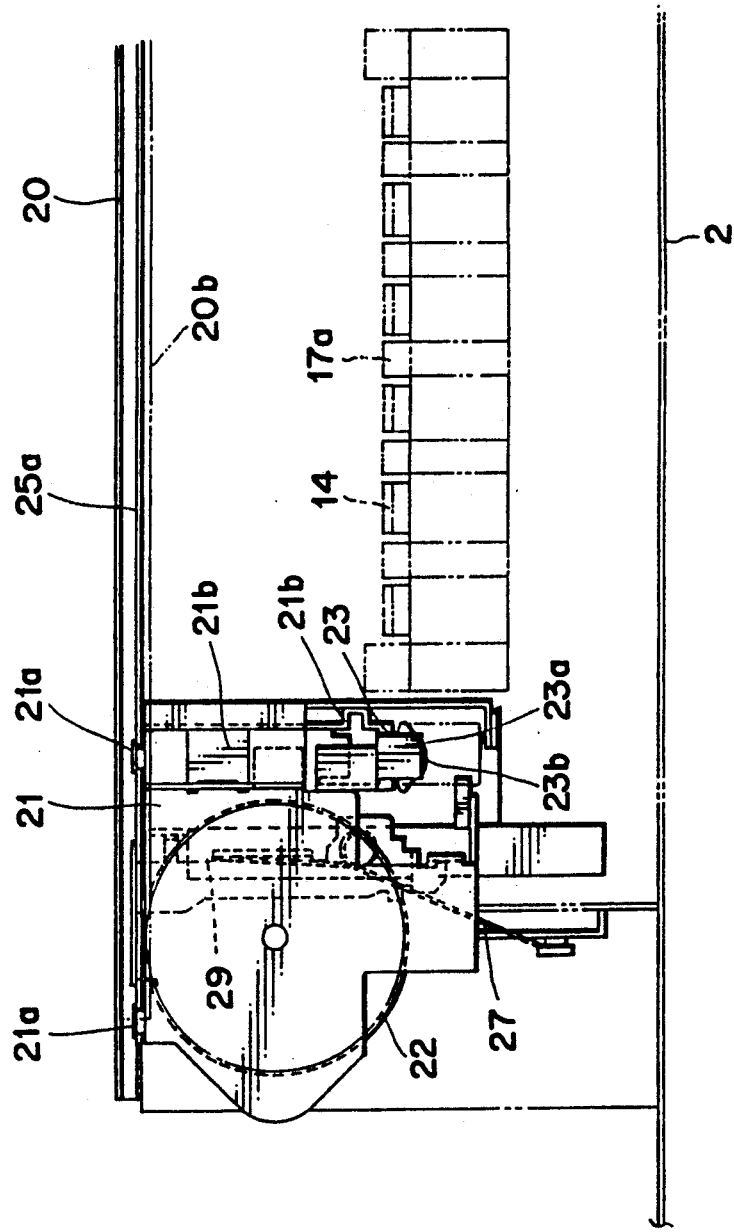
FIGS. 14 and 15 are a rear elevational view and a side elevational view, respectively, showing the carrier operating mechanism in the position shown in FIG. 13.

Referring also to FIG. 14, a gear wheel 22 is supported for rotation on the carrier 21 and normally held in meshing engagement with a rack 20b provided on the rail member 20 along the rear side rail slot 20a so that, when the gear wheel 22 rotates, the carrier 21 may be moved along the rail slots 20a of the rail member 20.

Figure 19:
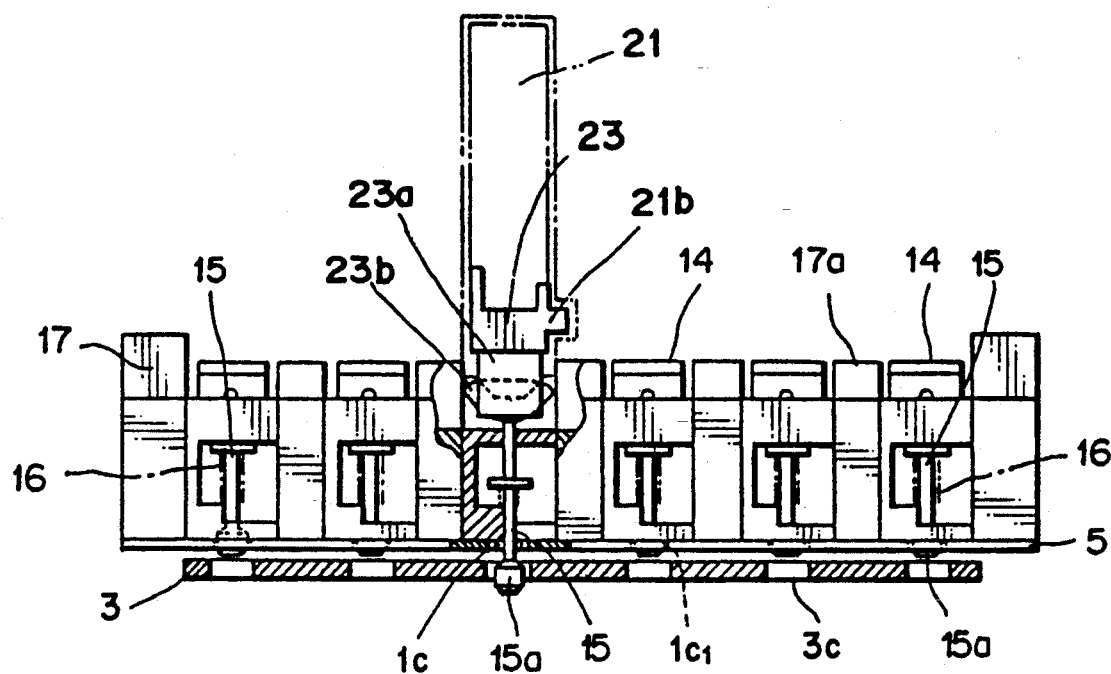
FIG. 19 is a side elevational sectional view showing a relationship between cassette receiving members and an aligning member.
Figure 20:
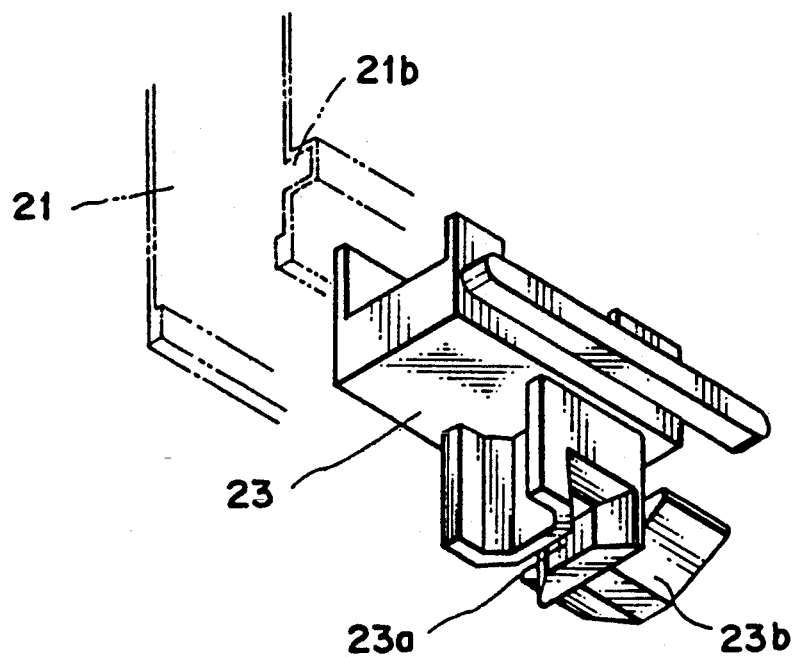
FIG. 20 is a perspective view showing the aligning member and the carrier.

A guide member 23 is mounted on a mounting portion 21b of the carrier 21. Referring to FIGS. 19 and 20, the guide member 23 has an aligning guide 23a for successively engaging, when the carrier 21 is moved along the rail slots 20a of the rail member 20, with the opposite front and rear faces of the aligning walls 14a and 17b of the cassette receiving members 14 and the accommodating member 17 to align the aligning walls 14a and 17b along a straight line, and a depressing guide 23b formed in an integral relationship with the aligning guide 23a for successively engaging, when the carrier 21 is moved along the rail slots 20a, with the top ends of the pins 15 of the cassette receiving members 14 to push down the pins 15 against the springs 16.

Figure 16:
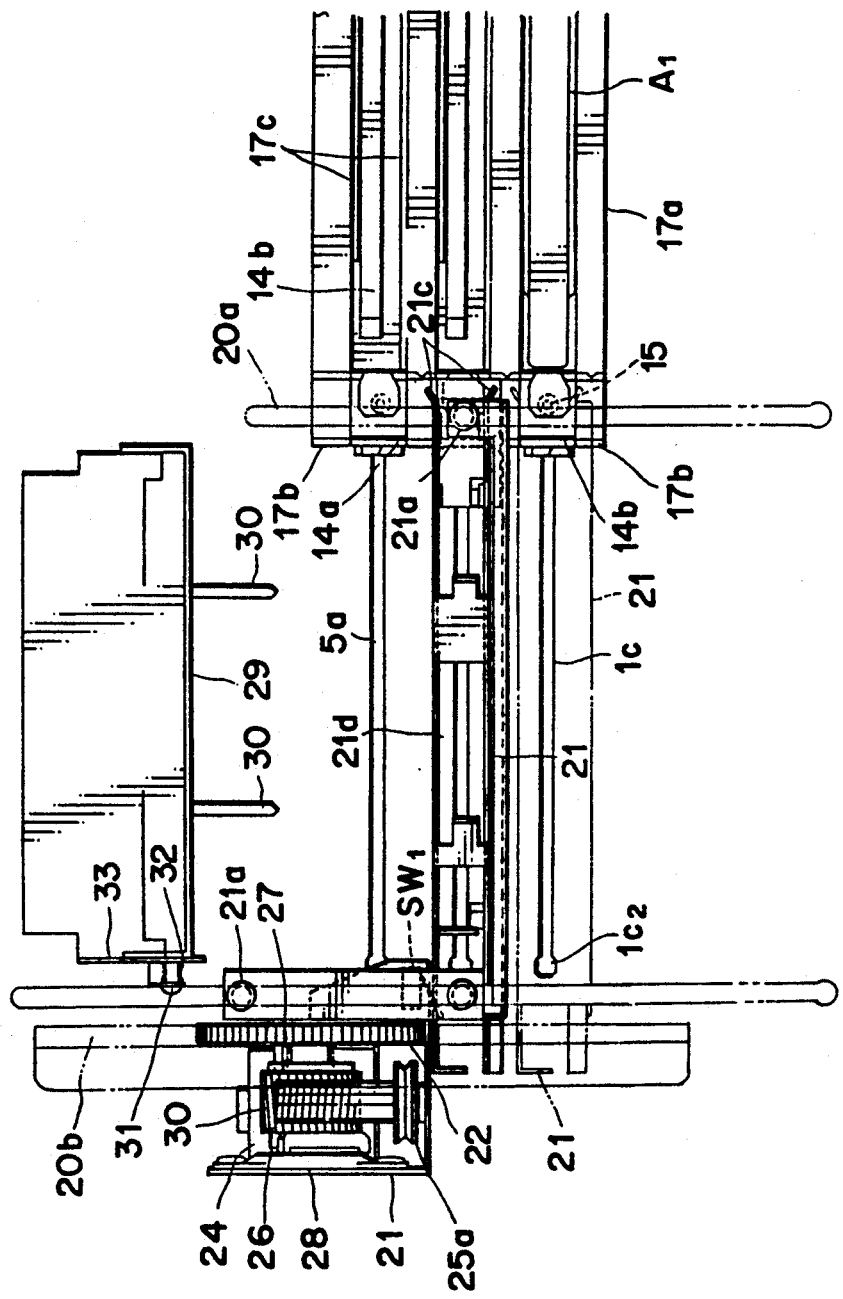
FIG. 16 is a plan view similar to FIG. 13 but showing the carrier operating mechanism when an accommodating chamber of the carrier comes to a position of a cassette receiving member preceding by one cassette receiving member distance to another cassette receiving member which is at the transfer position.
Figure 18:
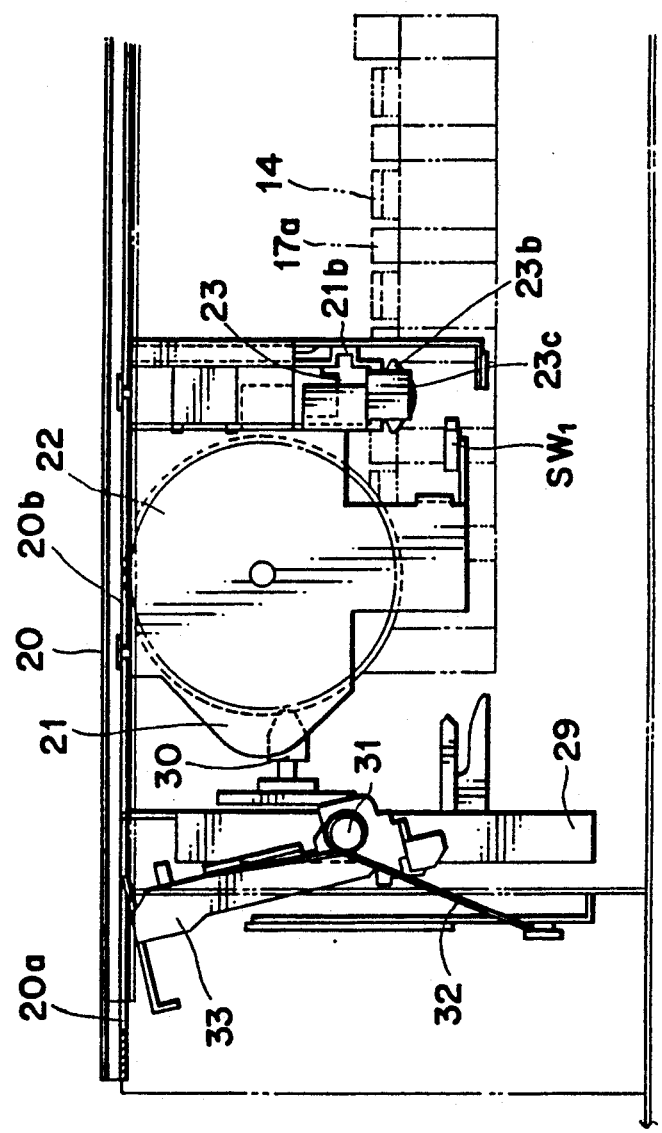
FIG. 18 is a rear elevational view showing the carrier operating mechanism in the position shown in FIG. 17.

Referring to FIGS. 15 to 17, the carrier 21 has an accommodating chamber 21d for a tape cassette A which is defined by a pair of introducing walls 21c having outwardly bent ends and opened toward the accommodating member 17. The carrier 21 further has a detecting switch $SW_1$ located thereon as shown in FIGS. 16 and 18 such that it is pushed and turned on by a cassette receiving member 14 when the expanded portion 15a of the pin 15 on the cassette receiving member 14 is received in the rear expanded portion $1c_2$ of the associated guide slot 1c.

A motor 24 is mounted on the carrier 21 and connected to a pulley 25a by way of a mechanism including a pulley and a belt. The pulley 25a is formed in an integrated relationship on a worm 25 which is normally held in meshing engagement with a worm gear 26. Accordingly, if the motor 24 is energized, then the worm gear 26 is rotated thereby.

Figure 21:
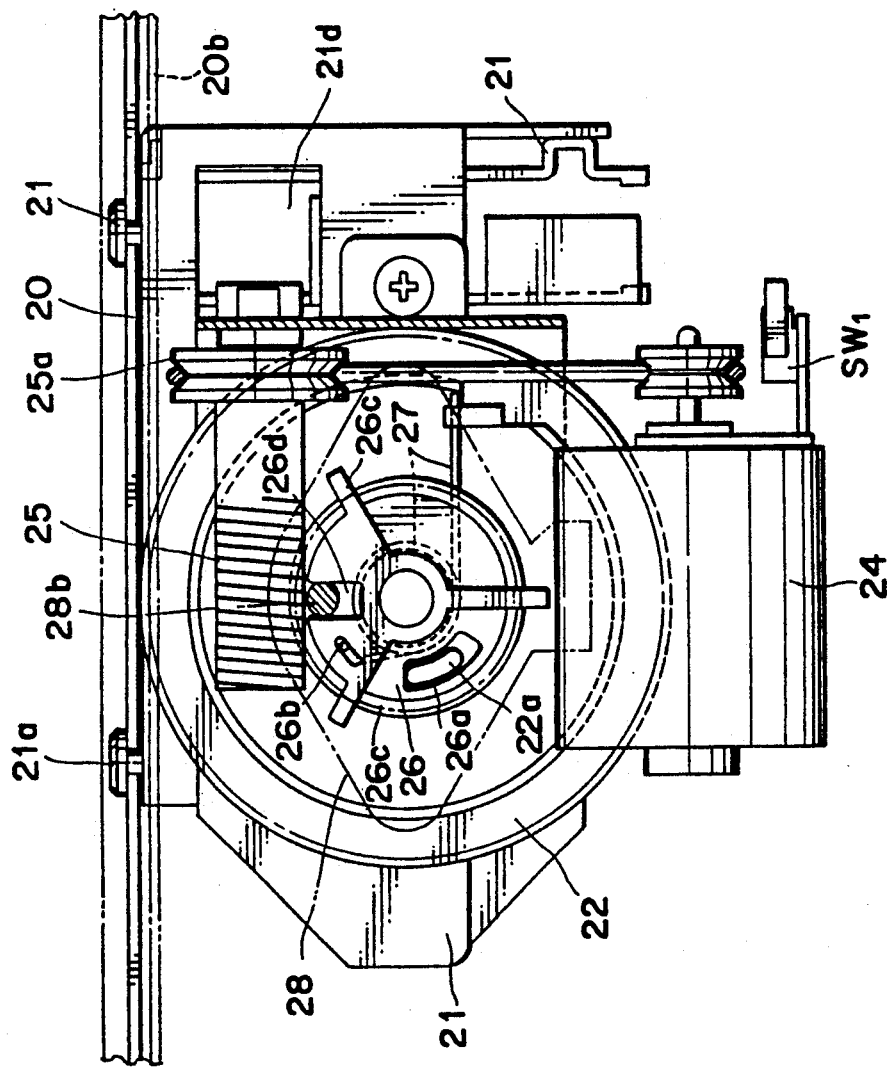
FIG. 21 is an enlarged partial rear elevational view of a carrier driving mechanism.

Referring to FIG. 21, the worm gear 26 and associated elements are shown. The worm gear 26 is mounted in a coaxial relationship with but for independent rotation from the gear wheel 22 and has an arcuate engaging hole 26a perforated axially therethrough. A projection 22a is formed on an end face of the gear wheel 22 and received in the engaging hole 26a of the worm gear 26 in such a manner as to restrict relative rotation of the gear wheel 22 and the worm gear 26 to a predetermined angular range.

Figure 22:
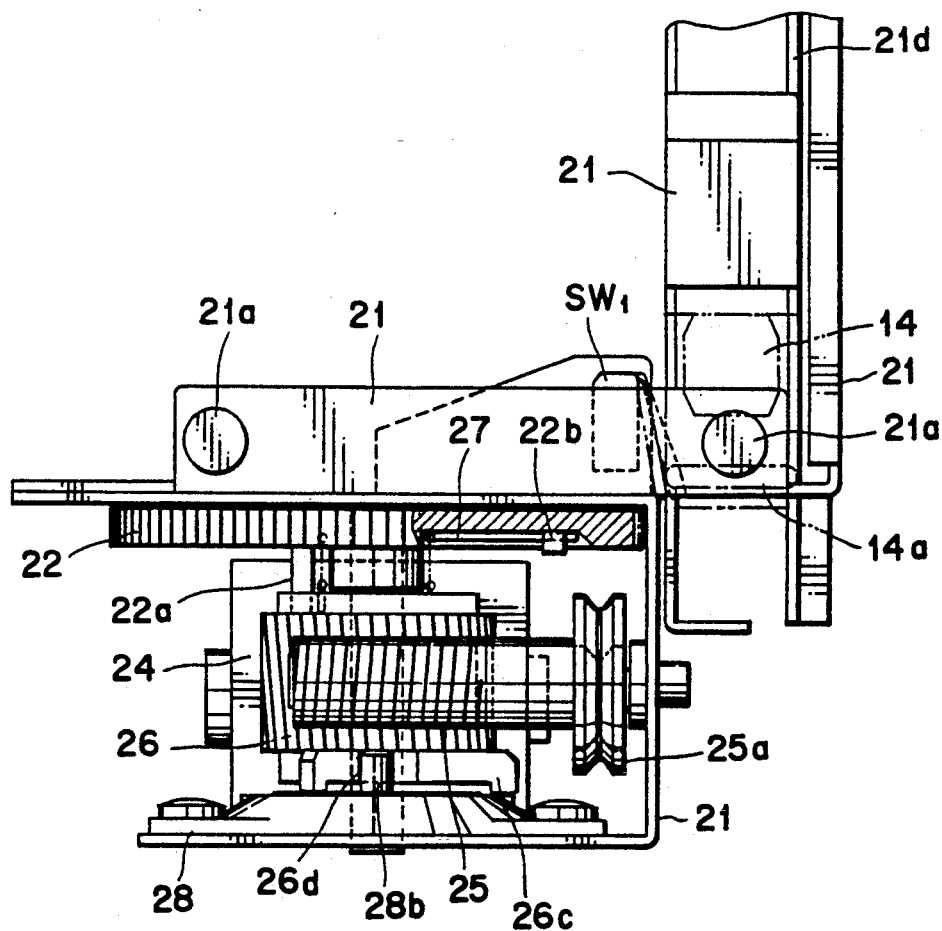
FIG. 22 is a top plan view of the carrier driving mechanism.
Figure 23:
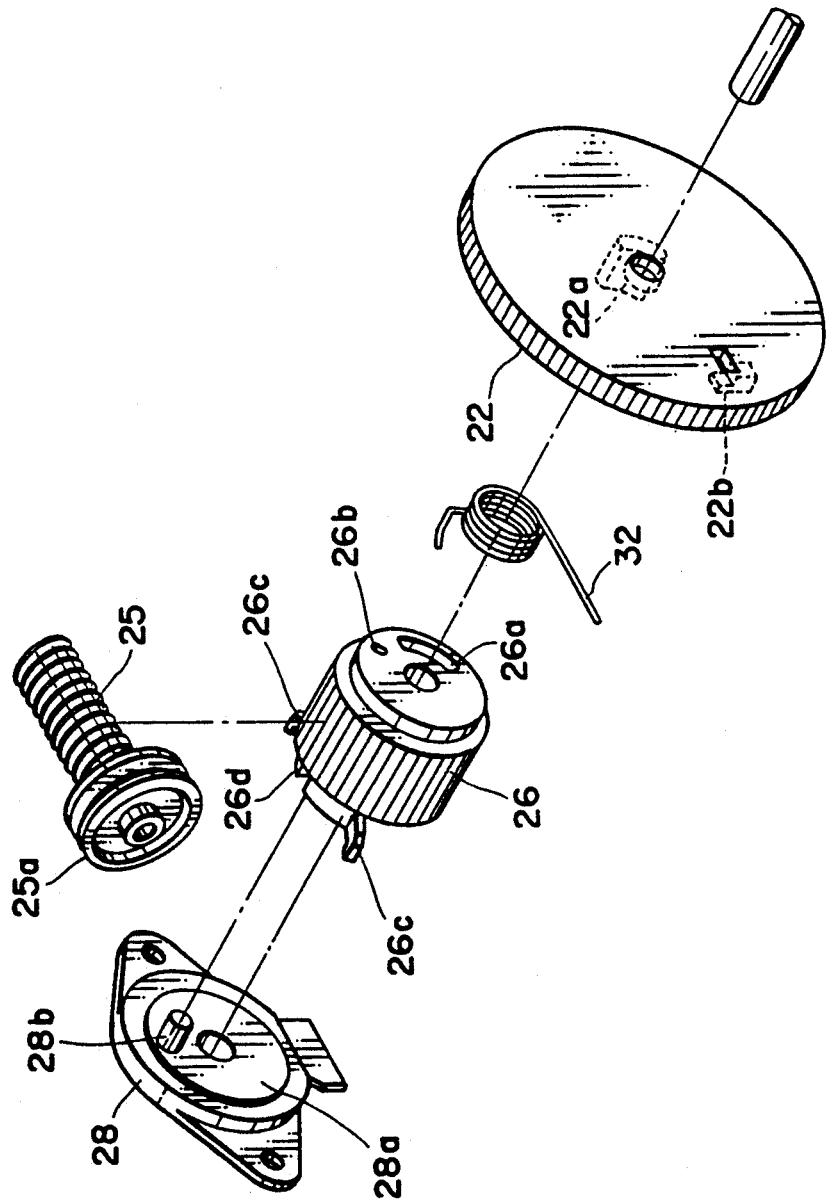
FIG. 23 is a fragmentary perspective view of the carrier driving mechanism.

Referring also to FIGS. 22 and 23, a torsion spring 27 extends between a hole 26b formed on an end wall of the worm gear 26 and an engaging tab 22b formed on the end face of the gear wheel 22 and normally biases the gear wheel 22 in the counterclockwise direction in FIG. 21 relative to the worm gear 26 until the projection 22a is engaged with a counterclockwise end of the arcuate engaging hole 26a. The worm gear 26 has a pair of pressing tabs 26c formed on the other end face thereof with an engaging recess 26d left therebetween. An encoder 28 is mounted on the carrier 21 in an opposing relationship to the worm gear 26, and a projection 28b formed on a face of a rotary element 28a of the encoder 28 is normally held in engagement with the engaging recess 26d of the worm gear 26 so that the rotary element 28a may be rotated by rotation of the worm gear 26.

Rotation of the worm gear 26 is transmitted to rotate the gear wheel 22 through engagement of the projection 22a on the gear wheel 22 with either end of the arcuate engagement hole 26a of the worm gear 26. Upon such rotation of the gear wheel 22, the carrier 21 is moved in the leftward or rightward direction in FIG. 14 along the rail slots 20a of the rail member 20 due to meshing engagement of the gear wheel 22 with the rack 20b. During such movement of the carrier 21, each time the accommodating chamber 21d thereof comes to a position of any cassette receiving member 14, the encoder 28 produces a signal by way of the rotary element 28a which is rotated by the worm gear 26.

Referring to FIG. 13, a plurality of, 6 in the embodiment shown, switches $C_{SW_1}$ to $C_{SW_6}$ are provided each of which is located such that it is pushed, when the tray base plate 1 is positioned at its home position on the inner side of a loading window of a front panel not shown of the tape player, by a tape cassette A placed on a corresponding cassette receiving member 14 to present an on-state to detect an accommodated condition of the tape cassette A.

Referring to FIGS. 14 and 16 to 18, the tape player further includes a tape feeding chassis 29 having a pair of reel driving members 30 mounted thereon for being inserted into reel holes $A_2$ (FIG. 15) of a tape cassette A to rotate reels not shown in the tape cassette A. Though not shown, a magnetic head, a pair of capstans and some other elements which are normally provided on a common tape player may also be mounted on the tape feeding chassis 29. One of such elements may be a detecting element not shown for detecting a safety lug which normally is snapped away after recording of the tape cassette A set on the tape feeding chassis 29 or for detecting a type of a tape of such tape cassette A.

The tape feeding chassis 29 has a lever 33 mounted for pivotal motion thereon by means of a shaft 31. The lever 33 is normally biased in the counterclockwise direction in FIG. 18 by a torsion spring 32 interposed between the lever 33 and the tape feeding chassis 29. Thus, when the carrier 21 is moved to the feeding chassis 29, the lever 33 is pivoted in the clockwise direction against the biasing force of the torsion spring 32 by the carrier 21 to put the detecting element into a detecting condition.

Operation of the tape player will be described in the following.

Figure 9:
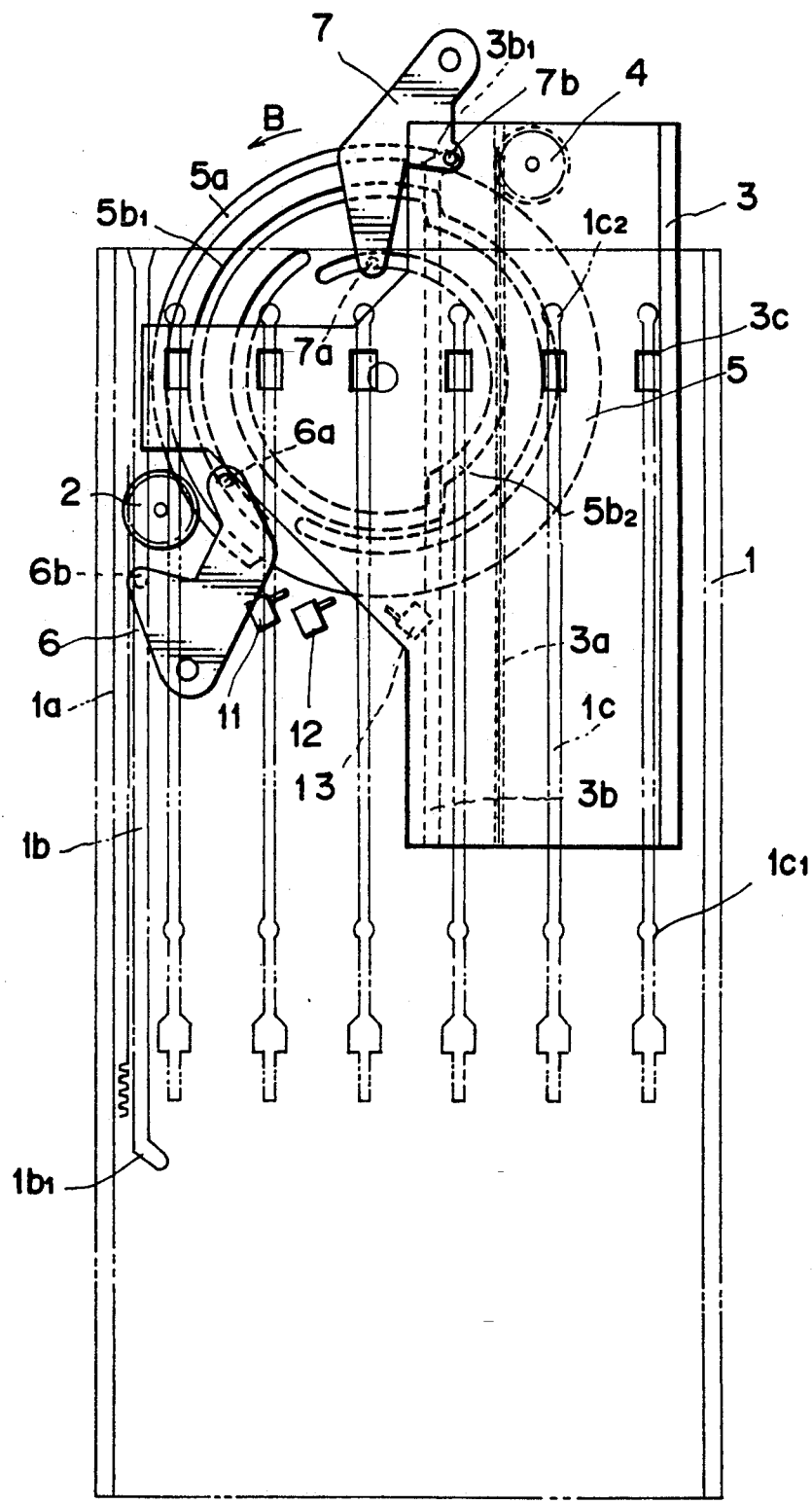
FIG. 9 is a plan view showing a relationship of the tray base plate, tray driving plate and cam plate of the record medium selecting apparatus.

Referring first to FIGS. 7 to 9, the tray base plate 1 is shown at it outwardly projected position at which it is partially exposed or projected outwardly from the cabinet of the tape player. At the position of the tray base plate 1, tape cassettes A can be arbitrarily inserted into and removed from the cassette receiving members 14 accommodated in the accommodating member 17 on the tray base plate 1. The tray driving plate 3 is at its home position, that is, at its forward end position, i.e., rightward end position in FIG. 8, with respect to the tray base I and below the cam Plate 5 as seen in FIG. 9. Meanwhile, the carrier 21 is at such a home position as shown in FIG. 13 at which it is in contact with the tape feeding chassis 29.

In this condition, if a loading button (not shown) provided on the front panel of the tape player is depressed, then the motor not shown for rotating the cam plate 5 is energized. Consequently, the cam plate 5 is rotated in the direction indicated by an arrow mark B in FIG. 9 by the motor by way of the gear train (not shown). Upon such rotation of the cam plate 5, the toothed portion of the gear 5a of the cam plate 5 is first put into meshing engagement with the rack teeth 1a of the tray base plate 1 by way of the first gear wheel 2. Consequently, the tray base plate 1 is thereafter moved leftwardly in FIG. 7, i.e., upwardly in FIG. 9 so that the accommodating member 17 on the tray base plate 1 and the cassette receiving members 14 received on the accommodating member 17 are drawn into the cabinet of the tape player.

In this instance, the rack teeth 3a of the tray driving plate 3 remain out of engagement with the gear 5a of the cam plate 5 by way of the second gear wheel 4 and the guide pin 7b of the second lever 7 is positioned at the bent portion $3b_1$ of the elongated groove 3b of the tray driving plate 3 with the engaging projection 7a of the second lever 7 guided by the cam groove 5b of the cam plate 5. Consequently, the tray driving plate 3 is kept fixed at the home position.

Then, after the tray base plate 1 comes to its position shown in FIG. 5, the engaging projection 6a of the first lever 6 is moved by the cam groove $5b_1$ of the cam plate 5 so that the guide pin 6b of the first lever 6 is introduced into the bent portion $1b_1$ of the elongated groove 1b of the tray base plate 1. Then, after a certain interval of time, the engaging projection 7a of the second lever 7 is moved by the cam groove $5b_2$ of the cam plate 5 so that the guide pin 7b is moved out of the bent portion $1b_1$ of the elongated groove 1b of the tray base plate 1 thereby to enable movement of the tray base plate 1.

Figure 24:
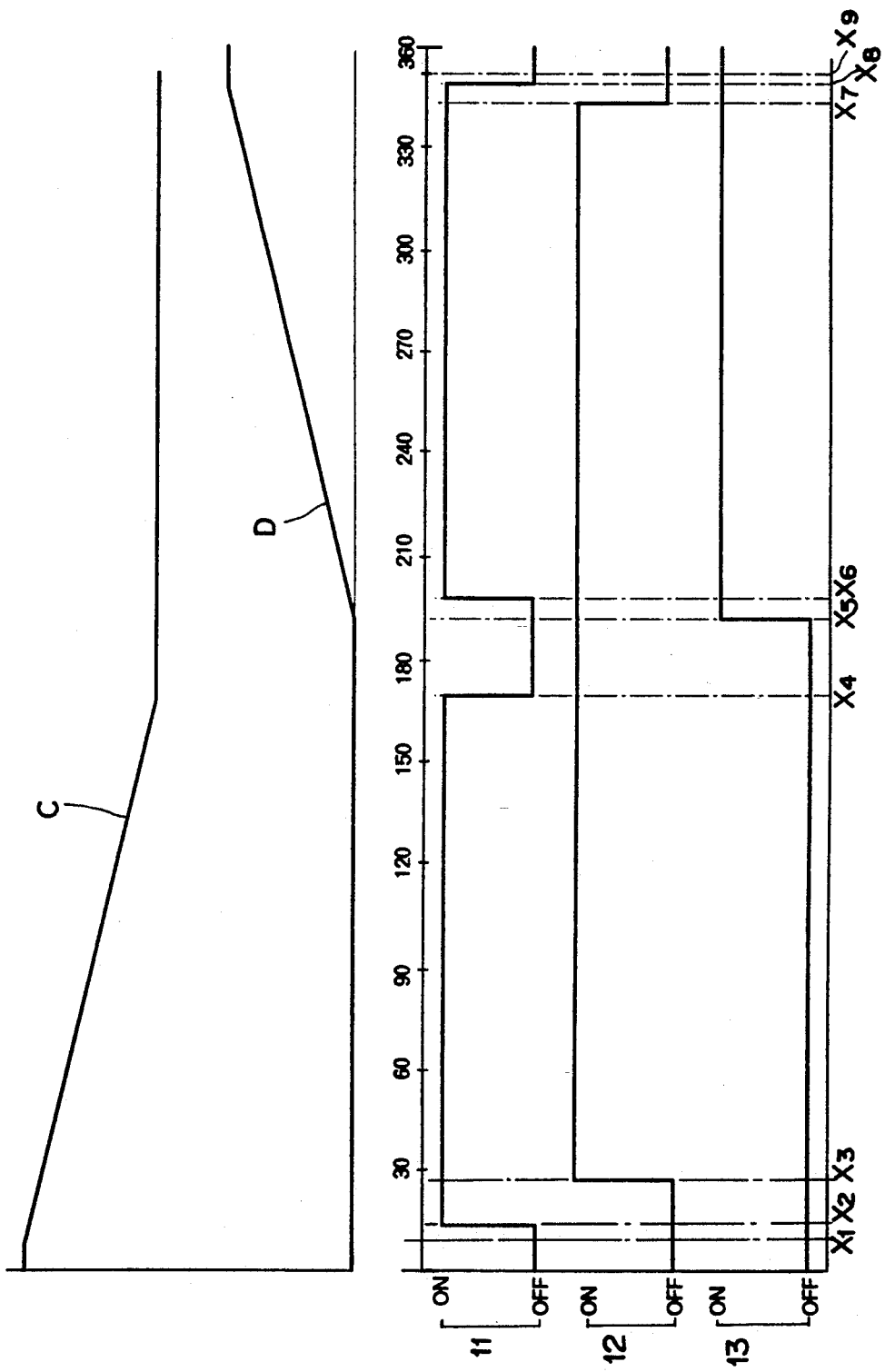
FIG. 24 is a time chart illustrating a relationship among operations of the tray base plate and tray driving plate and on/off operations of switches of the record medium selecting apparatus.

Referring to FIG. 24, a movement of the tray base plate 1 is indicated by a curve C; a movement of the tray driving plate 3 is indicated by another curve D; and on/off operations of the switches 11, 12 and 13 are indicated by respective curves 11, 12 and 13. As at a point of time $X_1$, before the cam plate 5 starts its movement or rotation, the switch 11 is in an off state due to a relation between the cam groove $5c_1$ of the cam plate 5 and the third lever 8: the switch 12 is also in an off state due to a relation between the cam groove $5c_2$ and the fourth lever 9; and the switch 13 is also in an off state due to a relation between the cam groove $5c_3$ and the fifth lever 10.

However, at another point of time $X_2$ after starting of rotation of the cam groove 5 at which the guide pin 7b of the second lever 7 can move along the elongated groove 1b of the tray base plate 1, the switch 11 is turn on by an action of the cam groove $5c_1$ upon the third lever 8.

Then, when this condition is reached, movement of the tray base plate 1 is started so that the accommodating member 17 and the cassette receiving members 14 are drawn into the player cabinet as seen from FIGS. 1 and 24 and as described hereinabove. Then, when the tray base plate 1 comes to the position shown in FIG. 5 and completes its movement, the switch 11 is turned off as at a point of time $X_4$ in FIG. 24. Then, at another point of time $X_5$ after the tray base plate I is further moved by its own inertia and so forth, the switch 13 is turned on. As a result, the motor for the cam plate 5 starts its rotation now in the reverse direction so that the cam plate 5 is rotated in the direction opposite to the direction of the arrow mark B.

Consequently, also the tray base plate 1 will be moved in the opposite direction. However, the switch 11 is immediately put into an on state as a result of the rotation of the cam plate 5 in the opposite direction, and consequently, the motor for the cam plate 5 and hence the cam plate 5 are stopped soon and the tray base plate 1 will not be moved. Such movement of the tray base plate 1 is intended to stop the tray base plate 1 accurately at an aimed position eliminating an otherwise possible influence of inertia and so forth so that an aligning operation of the aligning walls 17b of the accommodating member 17 and the aligning walls 14a of the cassette receiving members 14 by the aligning or guide member 23 (such aligning operation will be hereinafter described) and an inserting movement of a pin 15 into an expanded portion $1c_1$ of the tray base plate 1 and an engaging hole 3c of the tray driving plate 3 may be performed with certainty.

In this instance, the engaging holes 3c of the tray driving plate 3 are positioned below the pins 15 as seen in FIG. 3a, and the switches $C_{SW1}$ to $C_{SW6}$ present an on state because they are pushed by the tape cassettes A having moved to respective waiting positions by the accommodating member 17. Consequently, lamps in a display section provided on the front panel of the tape player corresponding to the switches $C_{SW1}$ to $C_{SW6}$ are lit. When no tape cassette is received in any of the cassette receiving members 14, a corresponding one of the switches $C_{SW1}$ to $C_{SW6}$ remains in an off state and the corresponding lamp is not lit. Accordingly, presence or absence of tape cassettes in the cassette receiving members 14 can be discriminated from the lamps.

When the tray base plate 1 and the tray driving plate 3 are individually in the home positions and the cassette receiving members 14 on which the tape cassettes A are placed are indicated on the display section, an arbitrary one of selection buttons (not shown) provided on the front panel of the tape player may be depressed to select one of those cassette receiving members 14 on which the tape cassettes A are placed, that is, to select one of the tape cassettes A. Thus, for example, the third selection button is selectively depressed.

In response to depression of the selection button, the motor 24 is energized to start its rotation. Rotation of the motor 24 is transmitted to the worm gear 26 to rotate the gear wheel 22 due to fitting engagement of the projection 22a of the gear wheel 22 in the engaging hole 26 of the worm gear 26. Since the gear wheel 22 is held in meshing engagement with the rack 20b of the rail member 20, the carrier 21 on which the gear wheel 22 is supported for rotation is moved in the downward direction in FIG. 13 along the rail slots 20a of the rail member 20.

Then, when the carrier 21 comes to a position at which the accommodating chamber 21d thereof coincides with the second cassette receiving member 14 preceding by one cassette receiving member distance to the third cassette receiving member 14 which has been selected by the third selection button as shown in FIG. 16, the position is detected by the encoder 28 from an angle of rotation over which the rotary member 28a of the encoder 28 connected to the worm gear 26 has been rotated. In response to such detection, the speed of rotation of the motor 24 is reduced. Consequently, the carrier 21 is moved now at a reduced speed to a position at which the accommodating chamber 21d thereof coincides with the selected third cassette receiving member 14 as shown in FIG. 17. The position is detected similarly by the encoder 28, and the motor 24 is stopped now.

During such movement of the carrier 21, the aligning guide 23a of the aligning member 23 mounted thereon is successively engaged with the front and rear opposite faces of the aligning walls 17b of the accommodating member 17 and the aligning walls 14a of the cassette receiving members 14 to arrange the aligning walls 17b and 14a on a predetermined straight line. Consequently, the expanded portions 15a of the pins 15 mounted on the cassette receiving members 14 are registered accurately with the engaging holes 3c of the tray driving plate 3. In this condition, the pins 15 are successively pushed down by the depressing guide 23b of the aligning member 23 on the carrier 21.

Consequently, the expanded portions 15a of the pins 15 are successively moved out of the expanded portions $1a_1$ of the guide slots 1a of the tray base plate 1 into the engaging holes 3c of the tray driving plate 3. After the aligning member 23 passes, each of the pins 15 is moved back upwardly by the corresponding spring 16 to move the expanded portion 15a thereof out of the engaging hole 3c back into the expanded portion $1a_1$ of the guide slot 1a. However, since the carrier 21 stops at the position at which the accommodating chamber 21d thereof coincides with the third cassette receiving member 14 and hence the aligning member 23 on the carrier 21 coincides with the pin 15 of the third cassette receiving member 14, the expanded portion 15a of the pin 15 remains received in the corresponding engaging hole 3c of the tray driving plate 3. Consequently, the third cassette receiving member 14 can thereafter move along the guide slot 1a together with the tray driving plate 3.

After stopping of the motor 24, the motor not shown for rotating the cam plate 5 is energized again to rotate the cam plate 5 in the first direction, that is, in the direction indicated by the arrow mark 5 in FIG. 5. Consequently, the guide pin 6b of the first lever 6 enters, due to an action of the cam groove $5b_1$ of the cam plate 5 upon the engaging projection 6a of the first lever 6, the bent portion $1b_1$ of the elongated slot 1b of the tray base plate 1 so that it prevents movement of the tray base plate 1 after then. Further, the cam plate 5 comes to a position at which the non-toothed portion of the gear 5a thereof is opposed to the first gear 2 so that the first gear 2 is not rotated any more by the cam plate 5. Consequently, the tray base plate 1 is stopped at the position.

On the other hand, the guide pin 7b of the second lever 7 is moved, due to an action of the cam groove $5b_2$ of the cam plate 5 upon the engaging projection 7a of the second lever 7, out of the bent portion $3b_1$ of the elongated groove 3b of the tray driving plate 3 thereby to enable movement of the tray driving plate 3 in the leftward direction in FIG. 1, i.e., in the upward direction in FIG. 5 while the gear 5a of the cam plate 5 is engaged with the rack teeth 3a of the tray driving plate 3 by way of the second gear 4 so that rotation of the cam plate 5 is thereafter transmitted to the rack teeth 3a to move the tray driving plate 3 in the leftward direction in FIG. 1, i.e., in the upward direction in FIG. 5.

Figure 11:
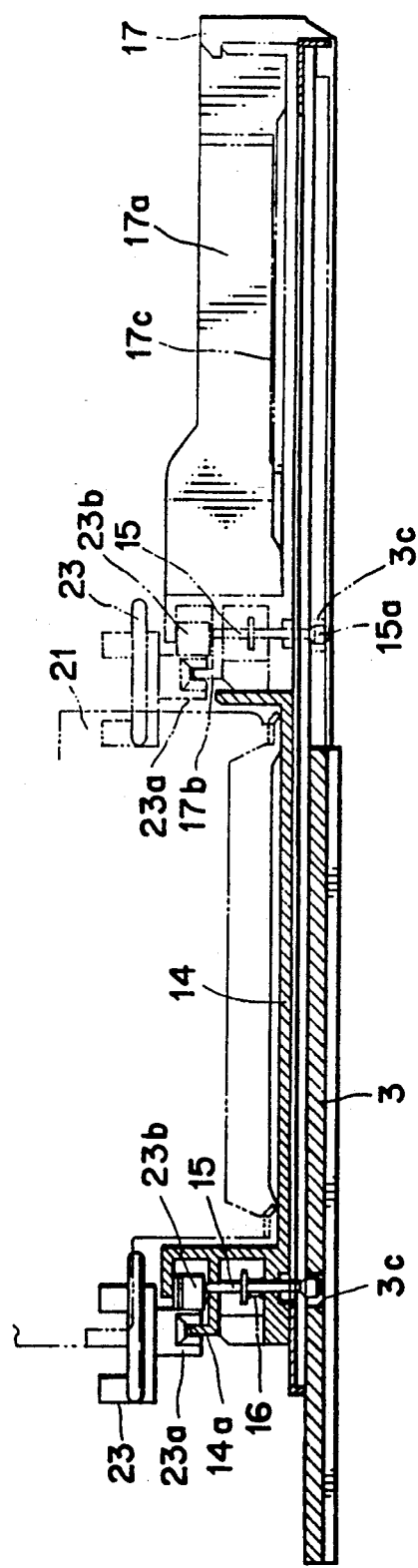

Then, when the position shown in FIGS. 11 and 12 is reached, the engaging projection 9a of the fourth lever 9 fitted in the cam groove $5c_2$ of the cam plate 5 is moved by the cam groove $5c_2$ so that the switch 12 is turned off by an action of the projection 9c of the fourth lever 9 as at a point of time $X_7$ in FIG. 24. In response to the switch 12, the speed of rotation of the motor for rotating the cam plate 5 is reduced to reduce the speed of movement of the tray driving plate 3. Then, when the tray driving plate 3 is further moved until it comes to the last end of the range of movement thereof, the switch 11 is turned off as at a point of time $X_8$ in FIG. 24 by an action of the cam groove $5c_1$ of the cam plate 5 upon the third lever 8. In response to the switch 11, the motor for the cam plate 5 is deenergized.

When the tray driving plate 3 is moved in this manner, also the third cassette receiving member 14 carried thereon is moved together therewith. Upon such movement of the cassette receiving member 14, the aligning guide 23a of the aligning member 23 is moved on the carrier 21 while keeping the pin 15 depressed because it engages with the opposite front and rear faces of the aligning wall 14a of the cassette receiving member 14.

Figure 10:
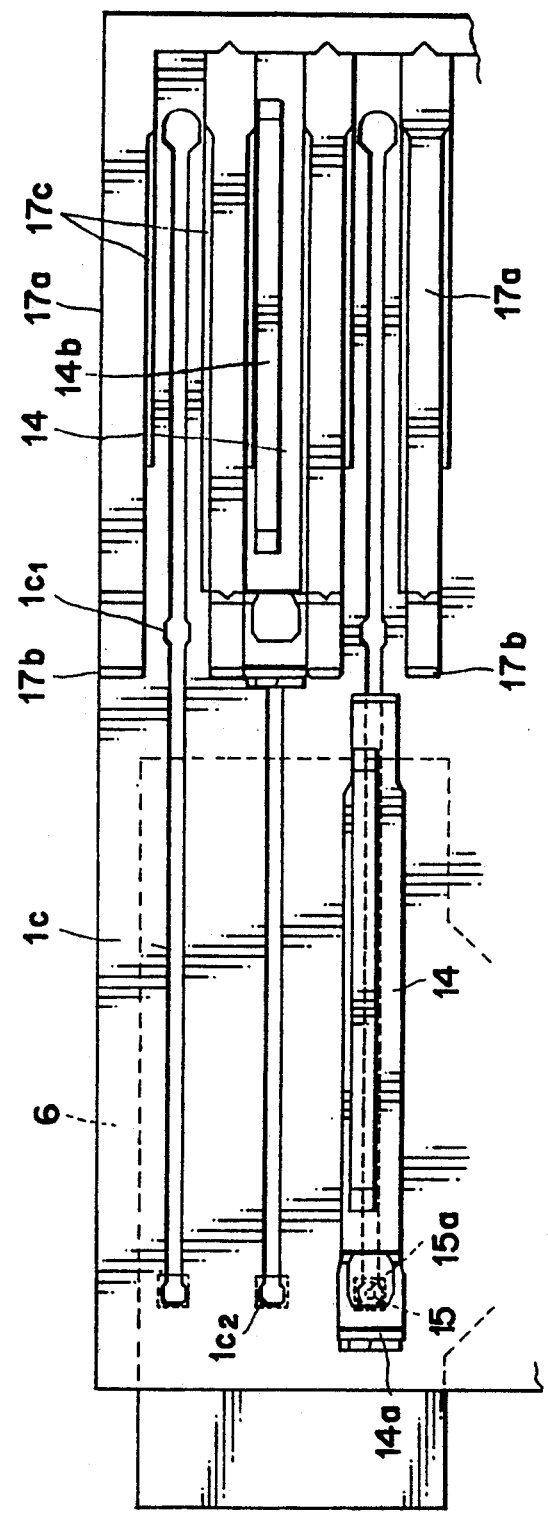
FIGS. 10 and 11 are a partial plan view and a sectional view, respectively, showing the tape cassette accommodating member at a transfer position.

When the cassette receiving member 14 is moved to its transfer position shown in FIGS. 10 and 11, the tape cassette A on the cassette receiving member 14 is introduced into the accommodating chamber 21d of the carrier 21 waiting there, thereby completing transfer of the tape cassette A from the cassette receiving member 14 to the carrier 21.

Upon completion of such transfer, the detecting switch $SW_1$ on the carrier 21 is pushed and turned on by the cassette receiving member 14 so that the motor 24 starts its rotation but now in the reverse direction. Consequently, the carrier 21 starts its movement reversely toward the tape feeding chassis 29. Upon such movement of the carrier 21, the aligning member 23 is moved together to cancel such depression of the pin 15 of the third cassette receiving member 14 by the depressing guide 23b as described above. As a result, the pin 15 is moved upwardly by the biasing force of the spring 16 to move the expanded portion 15a thereof into the expanded portion $1c_2$ of the guide slot 1c of the tray base plate 1. As a result, the cassette receiving member 14 is fixed to the position with respect to the tray base plate 1.

Meanwhile, the carrier 21 continues its movement toward the tape feeding chassis 29 until it is abutted at a wall of the accommodating chamber 21d thereof with the tape feeding chassis 29. At a final stage of such movement of the carrier 21, the reel driving members 30 of the tape feeding chassis 29 are fitted into the reel holes $A_2$ of the tape cassette A. Thereupon, the carrier 21 pushes the lever 33 to pivot around the shaft 31 on the tape feeding chassis 29 to enable discrimination of a type of the tape cassette A and presence or absence of a safety lug on the tape cassette A.

In this condition, however, the motor 24 is not deenergized yet and still continues its rotation to try to further move the carrier 21. Since the carrier 21 is mechanically stopped from movement by the tape feeding chassis 29, however, the gear wheel 22 is stopped from rotation. As a result, continued rotation of the motor 24 causes rotation of the worm gear 26 relative to the gear wheel 22 in a fixed condition while increasing the biasing force of the torsion spring 27. During such rotation of the worm gear 26, the projection 22a on the gear wheel 22 moves in the engaging hole 26a relative to the worm gear 26. Then, when the worm gear 26 is rotated over a predetermined angle relative to the gear wheel 22, the angular position of the worm gear 26 is detected by the encoder 28 and rotation of the motor 24 is stopped in response to such detection.

The biasing force of the torsion spring 27 described above will urge the gear wheel 22 to rotate in a direction to press the carrier 21 against the tape feeding chassis 29. Accordingly, the carrier 21 is prevented from moving away from the tape feeding chassis 29. Setting of the tape cassette A accommodated in the accommodating chamber 21d of the carrier 21 onto the tape driving mechanism is completed in this manner to enable subsequent reproduction, recording, fast feeding or rewinding of a tape of the tape cassette A.

If a return button (not shown) on the front panel of the tape player for entering an instruction of returning of a tape cassette A is depressed with the tape cassettes A set in such a condition as described above, then the motor 24 starts its rotation but in the first direction to move the carrier 21 away from the tape feeding chassis 29. Then, when the carrier 21 comes to the position at which the accommodating chamber 21d thereof coincides with the cassette receiving member 14 preceding by one cassette receiving member pitch to the cassette receiving member 14 the pin 15 of which is received at the expanded portion 15a thereof in the expanded portion $1c_2$ of the corresponding guide slot 1c of the tray base plate 1, this is detected by the encoder 28, and the speed of rotation of the motor 24 is reduced. Then, when the carrier 21 comes to the position at which the accommodating chamber 21d thereof coincides now with the cassette receiving member 14 the pin 15 of which is received at the expanded portion 15a thereof in the expanded portion $1c_2$ of the corresponding guide slot 1c, the aligning wall 14a of the cassette receiving member 14 is introduced into the aligning guide 23a of the aligning member 23 while the depressing guide 23b of the aligning member 23 pushes down the pin 15. Consequently, the expanded portion 15a of the pin 15 is moved out of the expanded portion $1c_2$ of the guide slot 1c of the tray base plate 1 into the engaging hole 3c of the tray driving plate 3.

Simultaneously, the detecting switch $SW_1$ on the carrier 21 is pushed and turned on by the cassette receiving member 14 while the encoder 28 detects the position of the cassette receiving member 14. Consequently, the motor 24 is stopped, and after then, the motor not shown for driving the cam plate 5 starts its rotation in the direction opposite to the direction indicated by the arrow mark B in FIG. 5.

Upon such rotation of the cam plate 5, the tray driving plate 3 is moved together with the cassette receiving member 14 from the position shown in FIGS. 10 and 11 toward the position shown in FIG. 3 while the aligning member 23 is moved together with the cassette receiving member 14 from a solid line position to a phantom position in FIG. 11 on the carrier 21. During such returning movement of the tray driving plate 3, the switch 11 is turned off and then the switch 13 is turned off by actions of the cam grooves $5c_1$ and $5c_3$ of the cam plate 5 as at points of time $X_6$ and $X_5$ in FIG. 24, respectively, by rotation of the cam plate 5 in the proximity of the last end of the returning movement of the tray driving plate 3. Consequently, rotation of the motor for the cam plate 5 is retarded so that the tray driving plate 3 is thereafter moved at a reduced speed from the position at the point of time $X_5$ in FIG. 24. Then, when the switch 11 is turned on by an action of the cam groove $5c_3$ of the cam plate 5, the motor for the cam plate 5 is stopped.

After the tray driving plate 3 is returned to the home position in this manner, the motor 24 is rotated again but in the reverse direction to return the carrier 21 to the initial position in which the carrier 21 is pressed against the tape feeding chassis 29 similarly as in setting of the tape cassette A.

The reason why the tray driving plate 3 is moved reversely by a little distance and is then decelerated during movement to its transfer position and also why the carrier 21 is decelerated at a position preceding to the cassette receiving member 14 from which the cassette A is to be transferred is that it is intended to assure prevention of inaccuracy of the stopping positions of those elements which may arise from impact and inertia of them and also to assure stopping of those elements at correct positions by prevention of otherwise possible backlashes of the associated driving mechanisms.

If the loading button on the front panel of the tape player is depressed while reproduction of a tape cassette A is being performed, then the motor for rotating the cam plate 5 is energized so that the tray base plate 1 and the tray driving plate 3 are advanced to the outwardly projected positions at which they are outwardly projected from the loading window of the front panel of the tape player as shown in FIGS. 7 to 8 while the third cassette receiving member 14 remains at the transfer position as described above. Consequently, the other tape cassettes A in the accommodating member 17 can be selectively exchanged. Accordingly, with the cassette changer, tape cassettes which are not being played can be exchanged during playing of a tape cassette.

In such an instance, from the partition wall 17a of the accommodating member 17 on one side of the cassette receiving section for the cassette receiving member 14 at the transfer position, the corresponding projecting wall 19 is projected by the biasing force of the torsion spring 18 to the cassette receiving section or location from which the cassette receiving member 14 has been moved. The projecting wall 19 thus prevents another tape cassette A from being placed to the cassette receiving section. Accordingly, insertion in error of another tape cassette A into the original location of the tape cassette A being played can be prevented effectively.

Further, it often happens that, for example, when the power source of the tape player is disconnected during playing of a tape cassette A, it becomes unknown to whichever cassette receiving member 14 the tape cassette A belongs. In such an instance, the unknown cassette receiving member 14 can be discriminated in the following manner. In particular, after the power source becomes available again, the carrier 21 is caused to move away from the tape feeding chassis 29 until the detecting switch $SW_4$ is turned on by the cassette receiving member 14 for the tape cassette A. The tape cassette A can be discriminated from an output of the encoder 28 then.

Having now fully described the invention, it will be apparent to one of ordinary skill in the art that many changes and modifications can be made thereto without departing from the spirit and scope of the invention as set forth herein.

What is claimed is:

1. An intermittently operating driving mechanism for a record medium selecting apparatus of player, comprising:
   a plurality of record medium receiving members each for removably receiving a record medium thereon;
   a first record medium carrying member carrying said record medium receiving members thereon and movable between a first position and a second position at which said record medium receiving members can selectively receive record media thereon, said first member having a toothed portion thereon;
   means for selecting one of said record medium receiving members on said first member at the first position;
   a second record medium carrying member movable from a first position to a second position to transport a selected one of said record medium receiving members to a playing position to allow the record medium on the selected record medium receiving member to by played by said player and back from the second position to the first position to return the record medium to the selected record medium receiving member, said second member having a toothed portion thereon;
   a cam plate rotatable around a fixed axis and having a gear for selectively engaging with said toothed portion of a selected one of first and second members to move said selected one of said first and second members between its respective first and second position; and
   first and second cam levers for cooperating with said cam plate to positively hold said selected one of said first and second members, when said selected one of said first and second members is positioned at its respective first position to prevent said selected one of said first and second members from moving from its respective first position.

2. An intermittently operating driving mechanism as claimed in claim 1, wherein said gear of said cam plate is an intermittent gear having a toothed portion and a non-toothed portion formed thereon such that only one of said first and second members can be driven at one time by said toothed portion of said gear.

3. An intermittently operating driving mechanism as claimed in claim 2, wherein each of the toothed portions of said first and second members comprises a rack formed on the respective one of said first and second members extending in the direction of movement thereof and further comprising a pair of intermediate gears for selectively transmitting rotation of said cam plate from said gear to said racks of said first and second members.

4. An intermittently operating driving mechanism as claimed in claim 3, wherein said intermediate gears are disposed substantially at opposite positions with respect to the axis of said cam plate.

5. An intermittently operating driving mechanism as claimed in claim 1, wherein said cam plate has a generally disk-shaped profile, and said gear is formed on an outer periphery of said cam plate.

6. An intermittently operating driving mechanism as claimed in claim 1, wherein each of said first and second members has a guideway formed thereon in the direction of movement thereof, while each of said first and second cam levers has at an end thereof a pin which is fitted in said guideway of a respective one of said first and second members, and an end portion of each is received when the respective one of said first and second members is at the first position is bent so as to prevent said respective one of said first and second members from moving from the first position.

7. An intermittently operating driving mechanism as claimed in claim 6, wherein said first and second cam levers are disposed between said cam plate and said first and second members.

8. An intermittently operating driving mechanism as claimed in claim 1, further comprising an additional cam lever for cooperating with said cam lever, and a switch operated by said additional cam lever to produce an electric signal for controlling rotation of said cam plate.

9. An intermittently operating driving mechanism as claimed in claim 1, wherein said cam plate has first and second cam grooves formed thereon for cooperating with pins on said first and second cam levers.

10. An intermittently operating driving mechanism as claimed in claim 9, wherein said cam plate has an additional cam groove formed thereon, and further comprising an additional cam lever for cooperating with said cam lever, and a switch operated by said additional cam lever to produce an electrical signal for controlling rotation of said cam plate.

11. An intermittently operating driving mechanism as claimed in claim 10, wherein said first and second cam grooves are formed on one face of said cam plate while said additional cam groove is formed on the other face of said cam plate.

12. An intermittently operating driving mechanism as claimed in claim 9, wherein said first and second cam grooves extend substantially over 360 degrees around the axis of said cam plate, and said cam plate is rotated over about 360 degrees around the axis between two predetermined angular positions.

* * * * *